United States Patent
Hosseinian et al.

(10) Patent No.: US 12,363,666 B2
(45) Date of Patent: *Jul. 15, 2025

(54) METHODS FOR TIMING ADVANCE INDICATION AND TIMING RELATIONSHIPS INDICATION FOR NON-TERRESTRIAL NETWORKS

(71) Applicant: Samsung Electronics Co., Ltd., Suwon-si (KR)

(72) Inventors: Seyed Mohsen Hosseinian, San Diego, CA (US); Jung Hyun Bae, San Diego, CA (US); Homayoon Hatami, San Diego, CA (US); Jungwon Lee, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,996

(22) Filed: Aug. 30, 2023

(65) Prior Publication Data
US 2023/0403667 A1 Dec. 14, 2023

Related U.S. Application Data

(63) Continuation of application No. 17/240,891, filed on Apr. 26, 2021, now Pat. No. 11,751,157.
(Continued)

(51) Int. Cl.
| | |
|---|---|
| *H04W 56/00* | (2009.01) |
| *H04W 64/00* | (2009.01) |
| *H04W 72/0446* | (2023.01) |
| *H04W 72/23* | (2023.01) |
| *H04W 84/06* | (2009.01) |

(52) U.S. Cl.
CPC ..... *H04W 56/0045* (2013.01); *H04W 56/005* (2013.01); *H04W 56/006* (2013.01);
(Continued)

(58) Field of Classification Search
CPC ........... H04W 56/0045; H04W 56/005; H04W 56/006; H04W 64/006; H04W 72/042;
(Continued)

(56) References Cited

U.S. PATENT DOCUMENTS

| | | |
|---|---|---|
| 10,433,301 B2 | 10/2019 | Guo et al. |
| 2005/0095982 A1 | 5/2005 | Blanchard et al. |

(Continued)

FOREIGN PATENT DOCUMENTS

WO 2019/195457 A1 10/2019

OTHER PUBLICATIONS

EP Office Action dated Mar. 1, 2023, issued in European Patent Application No. 21172823.3 (5 pages).
(Continued)

*Primary Examiner* — Dady Chery
(74) *Attorney, Agent, or Firm* — Lewis Roca Rothgerber Christie LLP

(57) ABSTRACT

A method of enabling communication between a user equipment (UE) and a non-terrestrial network (NTN), is described. The UE may be able to calculate a timing advance compensation. The timing advance compensation may be a differential or full timing advance compensation. An offset value, $K_{offset}$, may be indicated to the UE. The $K_{offset}$ value may be used for timing relationships.

20 Claims, 17 Drawing Sheets

Related U.S. Application Data

(60) Provisional application No. 63/090,639, filed on Oct. 12, 2020, provisional application No. 63/022,085, filed on May 8, 2020.

(52) U.S. Cl.
CPC ..... *H04W 64/006* (2013.01); *H04W 72/0446* (2013.01); *H04W 72/23* (2023.01); *H04W 84/06* (2013.01)

(58) Field of Classification Search
CPC ............. H04W 72/0446; H04W 84/06; H04W 56/0055; H04W 74/004; H04W 74/008; H04W 56/0005; H04W 56/004; H04B 7/1851; H04B 7/1853; H04B 7/1858; H04B 7/18513; G01S 19/01
See application file for complete search history.

(56) References Cited

U.S. PATENT DOCUMENTS

| | | |
|---|---|---|
| 2007/0293157 A1 | 12/2007 | Haartsen et al. |
| 2012/0275436 A1 | 11/2012 | Chin et al. |
| 2013/0100938 A1 | 4/2013 | Kwon et al. |
| 2016/0173188 A1* | 6/2016 | Uchino ............. H04W 74/0833 370/316 |
| 2019/0349877 A1 | 11/2019 | Alasti et al. |
| 2021/0029658 A1* | 1/2021 | Mahalingam ...... H04B 7/18513 |
| 2021/0075501 A1* | 3/2021 | Xu ..................... H04B 7/18519 |

OTHER PUBLICATIONS

Taiwanese Office Action dated Nov. 29, 2024, issued in corresponding Taiwanese Patent Application No. 110116599 (8 pages).

\* cited by examiner

METHODS FOR TIMING ADVANCE INDICATION AND TIMING RELATIONSHIPS INDICATION FOR NON-TERRESTRIAL NETWORKS

CROSS-REFERENCE TO RELATED APPLICATION(S)

This application is a continuation of U.S. patent application Ser. No. 17/240,891, filed Apr. 26, 2021, which claims the benefit of U.S. Provisional Patent Application No. 63/022,085, filed May 8, 2020 and which claims the benefit of U.S. Provisional Patent Application No. 63/090,639, filed Oct. 12, 2020, the entire contents of which are herein incorporated by reference.

FIELD

One or more aspects of embodiments according to the present disclosure relate to wireless communication networks, and more particularly to managing timing advance and offset values for uplink transmissions in a wireless communication system.

BACKGROUND

Demand is rising for communication of data to and from mobile communication devices. Traditional mobile wireless communication networks are evolving into networks that communicate more data and over longer distances. A new radio (NR) technology for the next generation, (e.g. 5G NR) is currently being discussed by the 3GPP standards organization and accordingly, changes to the current body of the 3GPP standard are being submitted and considered to evolve and finalize the 5G NR standard.

SUMMARY

A method and system are disclosed from the perspective of the user equipment (UE).

A method of enabling communication between a user equipment (UE) and a non-terrestrial network (NTN), comprising: receiving, at the UE, satellite position data of the NTN, determining, at the UE, a UE position, calculating, at the UE, a first distance between the UE position and the satellite position data, calculating, at the UE, a timing advance based on the first distance, receiving, at the UE, a Koffset value, and applying, at the UE, one or both of the timing advance and Koffset to configure transmission or reception of communication with the NTN.

The method wherein the satellite position data is ephemeris or positional data.

The method wherein the UE further receives a gateway position data.

The method wherein the UE further calculates a second distance between the satellite position data and the gateway position data.

The method wherein the UE further calculates the timing advance by dividing the first distance by a speed to obtain a first propagation delay, dividing the second distance by the speed to obtain a second propagation delay, summing the first propagation delay and the second propagation delay, and doubling the sum.

The method wherein the timing advance is a full timing advance compensation.

The method wherein the UE further receives a reference point position data, wherein the reference point position data is on a feeder link.

The method wherein the UE further receives a common timing advance value.

The method wherein the UE further calculates a third distance between the reference point position data and the satellite position data.

The method wherein the UE further calculates the timing advance by dividing the first distance by a speed to obtain a first propagation delay, dividing the third distance by the speed to obtain a third propagation delay, summing the first propagation delay, the third propagation delay, and the common timing advance value, and doubling the sum.

The method wherein the timing advance is one of a full timing advance compensation and a differential timing advance compensation.

The method wherein the reference point position data is the satellite position data.

The method wherein the UE further receives a reference point position data, wherein the reference point position data is located in a cell that the UE is located in.

The method wherein the UE further receives a common timing advance value.

The method wherein the UE further calculates a fourth distance between the reference point position data and the satellite position data.

The method wherein the UE further calculates a differential timing advance by dividing the first distance by a speed to obtain a first propagation delay, dividing the fourth distance by the speed to obtain a fourth propagation delay, subtracting the fourth propagation delay from the first propagation delay, and doubling the subtraction.

The method wherein the UE receives a Koffset value in a group common DCI format, and/or a MAC-CE format, and the Koffset value is a fixed number of bits.

The method wherein the Koffset value is specific to the UE.

The method wherein the Koffset value is used in a configured grant type 1 transmission, wherein the UE adds an offset of Koffset multiplied by a number of symbols per slot value to a timing for the configured grant type 1 transmission.

The method wherein the Koffset value is used in a configured grant type 2 transmission, wherein the UE schedules to transmit a Physical Uplink Shared Channel (PUSCH) by a DCI by adding a Koffset value to the configured grant type 2 transmission.

The method wherein the Koffset value is used for a slot format indicator (SFI) to dynamically configure and reconfigure symbols or slots in a subframe, wherein the UE configures and reconfigures symbols or slots at least Koffset slots after an uplink slot.

The method wherein the Koffset value is greater than or equal to the timing advance.

The method wherein the Koffset value is used for timing for a PUSCH transmission scheduled by DCI.

The method wherein the Koffset value is used for timing for a Channel State Information (CSI) transmission on a PUSCH The method wherein the Koffset value is used for timing for a PUSCH transmission scheduled by a Random Access Response (RAR) grant The method wherein the Koffset value is used for Hybrid Automatic Repeat Request Acknowledgement (HARQ-ACK) transmission on Physical Uplink Control Channel (PUCCH).

The method wherein the Koffset value is used for timing for CSI reference resource transmission.

The method wherein the Koffset value is used for timing for aperiodic SRS transmission.

A system that enables communication between a user equipment (UE) and a non-terrestrial network (NTN), the system configured to: receive, at the UE, satellite position data of the NTN, determine, at the UE, a UE position, calculate, at the UE, a first distance between the UE position and the satellite position data, calculate, at the UE, a timing advance based on the first distance, receive, at the UE, a Koffset value, and apply, at the UE, one or both of the timing advance and the Koffset to configure transmission or reception of communication with the NTN.

The system further configured to receive a reference point position data.

The system further configured to receive a common timing advance value.

The system wherein the UE further calculates a third distance between the reference point position data and the satellite position data.

The system wherein the UE further calculates the timing advance by dividing the first distance by a speed to obtain a first propagation delay, dividing the third distance by the speed to obtain a third propagation delay, summing the first propagation delay, the third propagation delay, and the common timing advance value, and doubling the sum.

The system wherein the timing advance is one of a full timing advance compensation and a differential timing advance compensation.

The system wherein the reference point is the satellite position data.

The system wherein the system receives the Koffset value in a group common DCI format, and/or a MAC-CE format, and the Koffset value is a fixed number of bits.

BRIEF DESCRIPTION OF THE DRAWINGS

These and other features and advantages of the present disclosure will be appreciated and understood with reference to the specification, claims, and appended drawings wherein:

DETAILED DESCRIPTION OF DRAWINGS

The detailed description set forth below in connection with the appended drawings is intended as a description of example embodiments of a network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
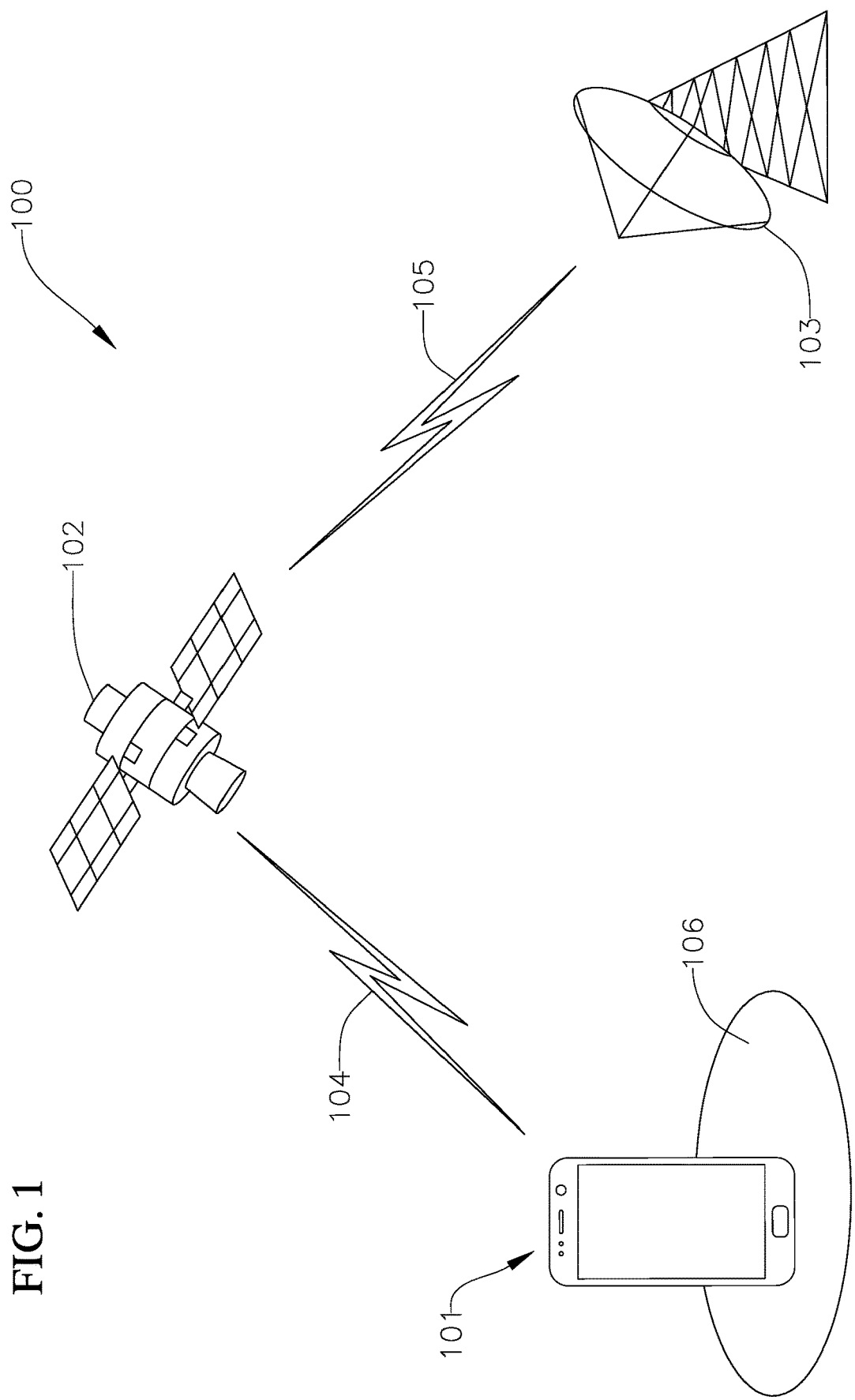
FIG. 1 is a schematic drawing of a network, according to an embodiment of the present disclosure.

Referring to FIG. 1, in some embodiments, a network 100 therein is shown. Network 100 may be a multiple access wireless communication system that supports a broadcast service, such as a non-terrestrial network (NTN). Network 100 may be designed to support one or more standards, such as 3rd Generation Partnership Project (3GPP). Network 100 may comprise a user equipment (UE) 101, satellite 102, and gateway 103.

UE 101 may be able to transmit, receive, store, and process data. UE 101 may be a transceiver system such as a mobile device, laptop, or other equipment.

Satellite 102 may be a space borne or airborne platform capable of sending and receiving data from UE 101 and gateway 103. Satellite 102 may be in communication with UE 101, where satellite 102 may be able to transmit and receive data from UE 101 over a service link 104. Service link 104 may include uplink (UL) and downlink (DL) data transmission.

Gateway 103 may be an antenna capable of sending and receiving data from satellite 102. Gateway 103 may be connected to or associated with a base station or logical radio node, such as a gNodeB (gNB) base station, not shown. In one embodiment, actions performed by gNB, such as scheduling and coordination, may be referred to as being performed by gateway 103, however, it may be understood that gNB may perform the command of sending data uplink or process receiving data downlink and gateway 103 may transmit data for gNB and also receive data for gNB. Gateway 103 may be in communication with satellite 102 over a feeder link 105. Feeder link 105 may include UL and DL data transmission. In one embodiment, UE 101, satellite 102, and gateway 103 may support a subcarrier spacing of 15, 30, 60, 120, or 240 KHz, however, other spacings may be supported.

Cell 106 may be a geographic area where UE 101 and other UEs (not shown) are capable of communicating with satellite 102. The size of cell 106 may vary depending on the location of satellite 102 relative to earth. For example, geostationary equatorial orbit (GEO) satellites may allow for a larger cell 106, which may be between 200 km to 3,500 km in diameter, in one embodiment. Medium earth orbit (MEO) and low earth orbit (LEO) may have smaller associated cell 106 sizes. Furthermore, the distance of satellite 102 to earth may affect the transmission time of transmitting and receiving data between UE 101 and satellite 102 and between satellite 102 and gateway 103. In one embodiment, a round trip delay (RTD) may be as high as 560 milliseconds (ms), 180 ms, and 60 ms for GEO, MEO, and LEO satellites systems, respectively. An RTD may be twice a propagation delay between a UE 101 and a gateway 103. UE 101 may be capable of handling these RTDs with modifications of the timing aspects in the physical layer or higher layers of an Open Systems Interconnection (OSI) model, and a timing advance (TA) mechanism.

In operation, the UE 101 may send data to (UL) or receive data from (DL) data to satellite 102, which may send (UL) or receive (DL) data to gateway 103, described in more detail below.

Figure 2:
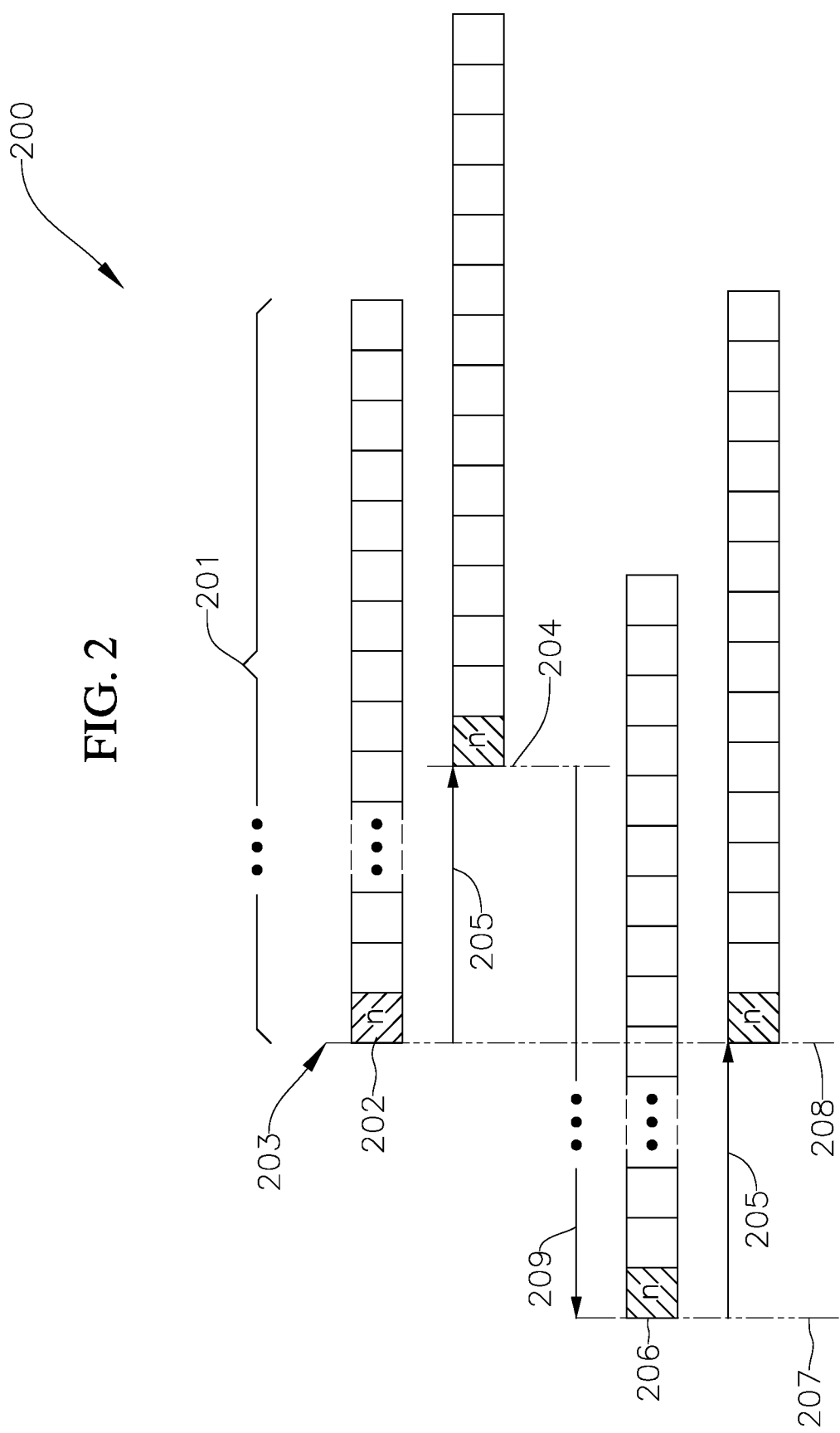
FIG. 2 is a schematic drawing of a full timing advance compensation, according to an embodiment of the present disclosure.

Referring to FIG. 2, therein is shown a full timing advance compensation 200 for a downlink and uplink to a base station, such as a gNB, via gateway 103. Full timing advance compensation 200 may be one type of NR timing offset between downlink and uplink transmission, which may be described below in more detail. Subframes 201 may comprise multiple subframes of data. A subframe 202 may be a subframe within subframes 201. Subframe 202 may comprise data transmitted over a time period. In one embodiment, subframe 202 may have a 1 ms duration, but other durations may be used. A subframe may comprise one or more slots, which may vary with subcarrier spacing. A slot may comprise one or more resource blocks, which may comprise symbols and subcarriers. A symbol may be a division of time within a slot, and a subcarrier may be a frequency. A resource element may be one unit of time and one frequency within a resource block. There may be a basic time unit $T_C$ which may be defined as $T_C=1/(15,000*2,048)$ seconds=32.6 nanoseconds which may be used for determining synchronization between UE 101, satellite 102, and gateway 103. In another embodiment, $T_C$ may be define as $T_C=1/(480,000*4096)$ seconds, however, other definitions may be used. In one embodiment, a 15 KHz subcarrier spacing may have one slot per subframe, a 30 KHz subcarrier spacing may have two slots per subframe, a 60 KHz subcarrier spacing may have 4 slots per subframe, and so on for 120 KHz and 240 KHz.

Subframes 201 may have different subframe structures, which may be Type 1, applicable to Frequency Division Duplex (FDD), or may be Type 2, which may be applicable to Time Division Duplex (TDD). Each subframe may be the same duration or different duration and may be used to transmit and receive data between the base station/gateway 103 and UE 101. Subframes may have reference subframe numbers, and may have timestamps associated with the beginning of each subframe. This information may be used for coordination of downlink and uplink transmission.

In another embodiment, subframes 201 may be frames, which may comprise multiple frames of data. In one embodiment, a frame may be 10 ms in duration and may comprise ten subframes of 1 ms each, however, the duration of the frame and the number of subframes may vary. Frames may have a frame number, which may be an index value and may be known as a System Frame Number (SFN). In one embodiment, the index values of SFNs may be between 0 and 1023, that is, there may be 1024 SFNs which may repeat after reaching the last index value of 1023.

A subframe 202 within subframes 201 may be of length n and may contain data that is to be transmitted between gateway 103 and UE 101 of FIG. 1. A base station (not shown) may send subframe 202 downlink to UE 101 via gateway 103 of FIG. 1 at gateway downlink reference time 203. In one embodiment, gateway downlink reference time 203 may be a time, or it may be a slot number, or other identifier. Subframe 202 may be received at a UE downlink reference time 204 after a propagation delay 205, which may be the time difference between the sending of subframe 202 at the base station/gateway 103 at downlink reference time 203 and receiving of subframe 202 at UE 101 at time UE downlink reference time 204.

Similarly, a UE 101 may send uplink a subframe 206 at a UE uplink time 207 to a base station/gateway 103 that may be received at gateway uplink time 208. There may be a propagation delay 205 between the UE uplink time 207 and gateway uplink time 208.

In a full timing advance compensation situation, the downlink reference time 203 and gateway uplink time 208 may be aligned. That is, within a range, downlink reference time 203 may be the same time as gateway uplink time 208. In one embodiment, the range may be $T_C$ as defined previously, however, other values may be employed. Data sent downlink from gateway 103 may be synchronized with data received uplink from UE 101. A timing advance 209 may be twice the propagation delay 205 and may allow for full timing advance compensation. A timing advance may be a negative offset value between the UE downlink reference time 204 and UE uplink time 207. The timing advance may be used to ensure that the downlink and uplink subframes are synchronized. In one embodiment, a full timing advance, or full timing advance compensation, may enable synchronization of downlink and uplink transmission timing between a UE 101 and a gateway 103.

In one embodiment, the timing advance 209 may be up to 2 milliseconds for a 15 kHz subcarrier spacing, which may allow for cell 106 to be 300 km in diameter. In NTN, however, due to very high altitudes of satellites, the RTD, or timing advance 208, may be in the hundreds of milliseconds to seconds range, as described in FIG. 1. In one embodiment, the timing advance 209 is twice the propagation delay 205, however, it may be larger. The timing advance 209 may be large compared to the duration of a subframe, such as subframe 202. In one embodiment, if the duration of a subframe is 1 ms, the timing advance 209 may be 560 ms, however, other values may be used.

Figure 3:
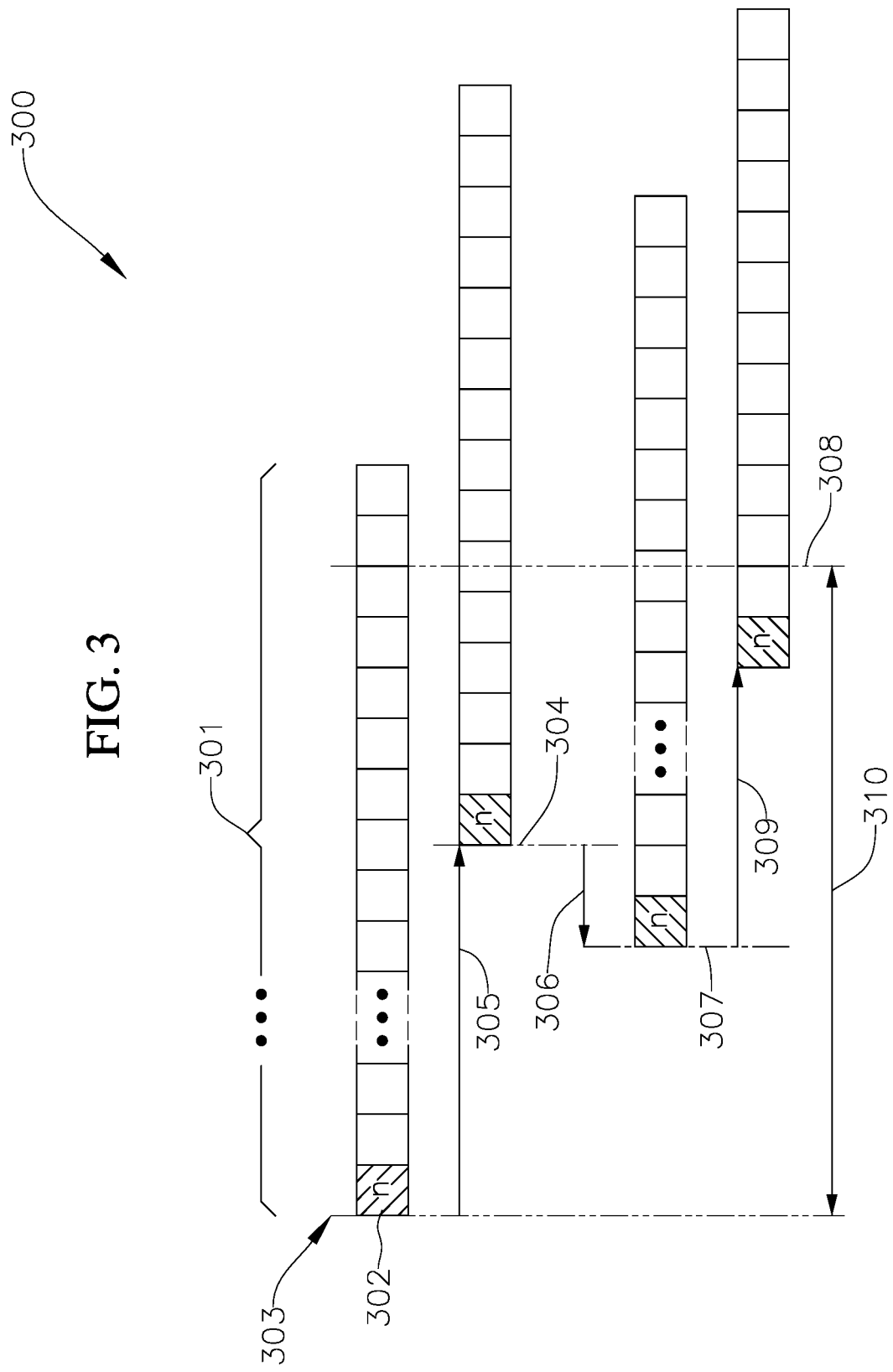
FIG. 3 is a schematic drawing of a differential timing advance compensation, according to an embodiment of the present disclosure.

Referring to FIG. 3, therein is shown a differential timing advance compensation 300 for a downlink and uplink to a base station, such as a gNB, via gateway 103 of FIG. 1. Differential timing advance compensation 300 may be one type of NR timing offset between downlink and uplink transmission. Subframes 301 may comprise multiple subframes of data. Each subframe may be the same duration or a different duration and may be used to transmit and receive data between the base station/gateway 103 and UE 101 of FIG. 1. In another embodiment, subframes 301 may comprise multiple frames of data.

A subframe 302 may be within subframes 301. A base station (not shown) may send subframe 302 downlink to UE 10 via gateway 103 of FIG. 1 at a gateway downlink time 303 and it may be received at a UE downlink time 304. A propagation delay 305 may be the time difference between the sending of subframe 302 at the base station/gateway 103 at downlink reference time 303 and receiving at UE downlink time 304. A propagation delay 305 may be the time difference between the sending of subframe 302 at the base station/gateway 103 at downlink reference time 303 and receiving of subframe 302 at UE 101 at time UE downlink reference time 304.

Similarly, a UE 101 may send uplink a subframe at EU uplink time 307 to a base station/gateway 103 that may be received at gateway uplink time 308. There may be a propagation delay 309 between the UE uplink time 307 and gateway uplink time 308.

Furthermore, there may be a differential timing advance 306 that may be the difference between UE uplink time 307 and UE downlink time 304. A common timing advance offset 310 may be the sum of propagation delay 305 and propagation delay 309, reduced by differential timing advance 306.

In one embodiment, a differential timing advance may be a negative offset value between the UE downlink time 304 and UE uplink time 307. The differential timing advance may be used to ensure that the gateway 103 may transmit subframes downlink to UE 101 at a first time and receive subframes uplink from UE 101 at a second time that is different than the first time. Gateway 103 may be able to receive subframes uplink from multiple UEs (not shown) at the second time, that is, subframes transmitted uplink to gateway 103 are synchronized.

With differential timing advance compensation, common timing advance offset 310 may not be twice propagation delay 305, as described above in FIG. 2 for full timing advance compensation. In some embodiments, the differential timing advance 306 may be specific to each UE 101. There may be a common timing advance offset time 310 between gateway downlink time 303 and gateway uplink time 308. Depending on how large the round trip delay is and how small the UE-specific differential timing advance 306, the value of common timing advance offset time 310 may be as large as 540 ms, however, other values may be used.

In both the full timing advance compensation 200 and differential timing advance compensation 300 methods described previously, additional complexity may be utilized to manage the scheduling and timing of subframe uplinks and downlinks. New radio physical layer timing relationships may be enhanced to manage a timing advance offset for the downlink and uplink timing for UE 101. A timing relationship may be a transmission of reception of communication and may be with the NTN. UE 101 may use a timing advance compensation to configure a timing relationship. New radio timing advance may be estimated by a network through MSG1 or msgA steps, for 4-step and 2-step random access procedures, respectively. However, additional methods for timing advance estimations may be described previously and below.

The timing advance may be transmitted, otherwise referred to as indicated, to UE 101 by a timing advance command. For example, for an NTN, UE 101 may have Global Navigation Satellite System (GNSS) capabilities. That is, a UE 101 may have knowledge of its own geolocation or location. Geolocation data for satellite 102 may also be known to UE 101 (or made known). Satellite 102 may transmit satellite position data to UE 101, which may be ephemeris data or any other kind of positional data. Ephemeris data may include the orbital position of satellite 102, including information such as week number, satellite accuracy, health, age of data, satellite clock correction coefficients, and other orbital parameters. In another embodiment, satellite 102 may transmit coordinate data to UE 101.

UE 101 may be capable of calculating timing advance 209 or common timing advance offset time 310 with its own geolocation data and ephemeris data or coordinate data from satellite 102, which will be described in more detail below. UE 101 may be able to calculate a first distance between UE 101 and satellite 102 using satellite position data of satellite 102 and location data of UE 101. A first propagation delay may be calculated from the first distance by dividing the first distance by a speed. In one embodiment, the speed may be the speed of light in free space. UE 101 may also be able to calculate a second distance between satellite 102 and gateway 103 using satellite position data of satellite 102 and gateway position data of gateway 103. A second propagation delay may be calculated from the second distance by dividing the second distance by a speed. In one embodiment, the speed may be the speed of light in free space. This information may be described in more detail below and may be used to calculate a full or differential timing advance compensation. In another embodiment, UE 101 may receive first propagation delay and second propagation delay data and may use it to calculate a full or differential timing advance compensation.

Depending on the location of satellite 102 (LEO, MEO, or GEO), the round trip propagation delay may be smaller or larger. UE 101 may have a flexible timing advance mechanism that is capable of adapting to the deployment scenario of satellite 102 (LEO, MEO, or GEO).

Figure 4:
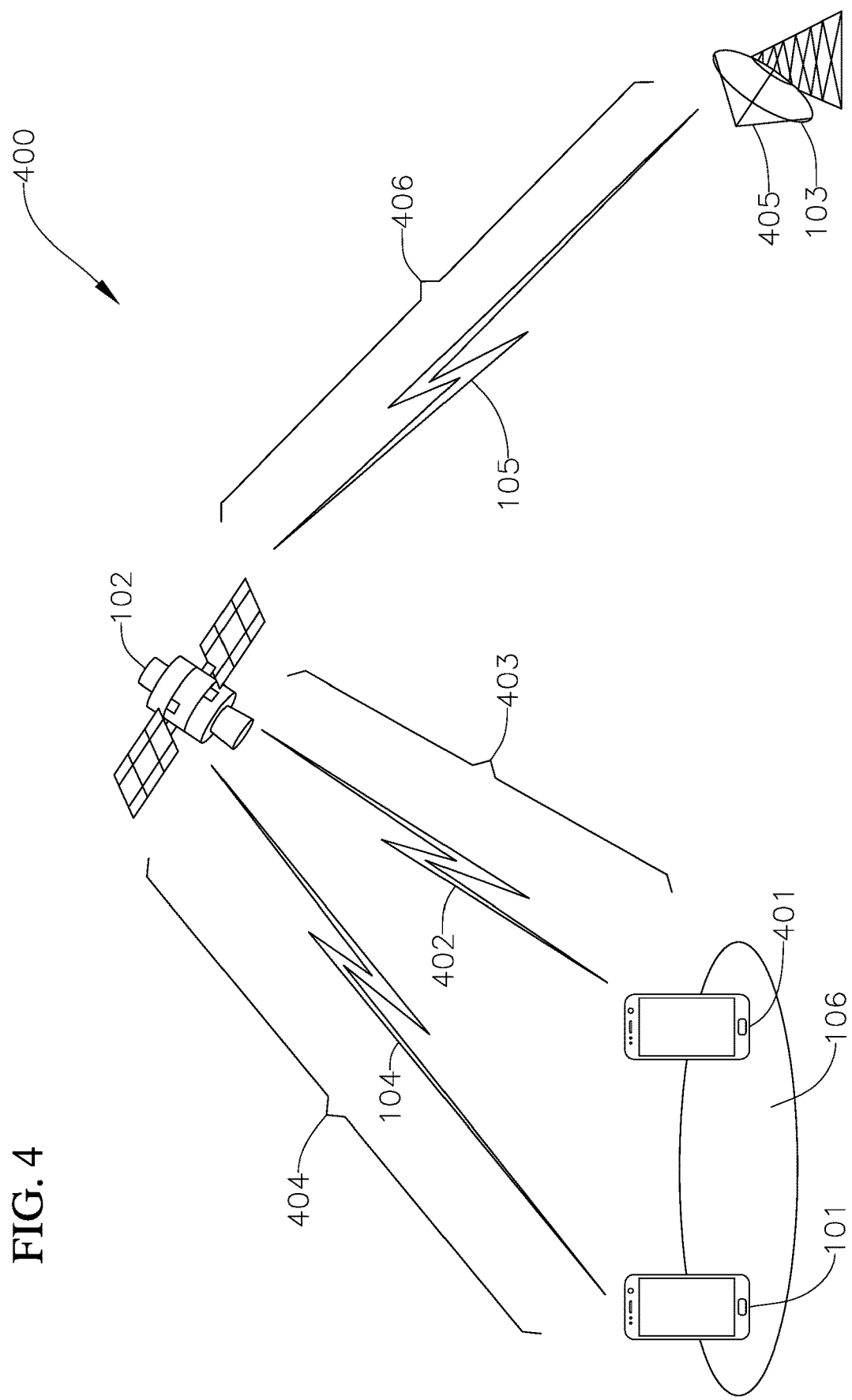
FIG. 4 is a schematic drawing of a non-terrestrial network (NTN), according to an embodiment of the present disclosure.

Referring to FIG. 4, an example NTN communication architecture 400 therein is shown, which may be NTN communication architecture 100 with an additional UE 401. UE 401 may be in cell 106 and may be in communication with satellite 102 via service link 402. UE 101 may receive information to calculate and indicate a full timing advance compensation, which may include GNSS data of UE 101, satellite 102, and a reference point 405. In one embodiment, reference point 405 may be the geolocation of gateway 103. The distance between satellite 102 and reference point 405 may be distance 406, which may be denoted as $d_{g,s}$. The distance between UE 101 and satellite 102 may be distance 404, which may be denoted as $d_{s,u}$. Similarly, the distance between UE 401 and satellite 102 may be distance 403, which may be denoted as $d_{s,u2}$ 403.

The reference point 405 geolocation information may be in the form of Earth-Centered, Earth-Fixed (ECEF) coordinate or may be any other form of coordinates which may provide the relative location of the reference point 405 with respect to a fixed origin point that is known to both a gNB via gateway 103 and UE 101. The reference point 405 geolocation information may also be in the form of an index that points to a location in a table of a set of all predetermined reference points' location information. UE 101 may additionally have ephemeris data for satellite 102 which may be in ECEF Cartesian form, which may include an x, y, and z coordinate as a function of time. UE 101 may be able to calculate the satellite 102 location by any interpolation technique.

UE 101 may calculate a first propagation time between UE 101 and satellite 102 by calculating distance 404 and dividing it by a speed. In one embodiment, the speed may be the speed of light in free space, c, which may be denoted as $T_{s,u}$. This may be the equation $T_{s,u}=d_{s,u}/C$. Distance 404 may be calculated by the UE 101 by using geolocation data of UE 101 and satellite 102. Similarly, UE 101 may calculate a second propagation time between satellite 102 and reference point 405 by calculating distance 406 and dividing it by the speed of like in free space, c, which may be denoted as $T_{g,s}$. This may be the equation $T_{g,s}=d_{g,s}/C$. Distance 404 may be calculated by the UE 101 by using geolocation data of satellite 102 and reference point 405. A total timing advance value TA may be calculated by UE 101 as twice the sum of $T_{g,s}$ and $T_{s,u}$, or: $TA=2(T_{g,s}+T_{s,u})$. In one embodiment, this may be timing advance 209 of FIG. 2.

A similar calculation may be performed by UE 401. UE 401 may calculate a propagation time between UE 401 and satellite 102 by calculating distance 403 and dividing it by a speed. In one embodiment, the speed may be the speed of light in free space, c, which may be denoted as $T_{s,u2}$. This may be the equation $T_{s,u2}=d_{s,u2}/c$. Distance 403 may be calculated by the UE 401 by using geolocation data of UE 401 and satellite 102. Similarly, UE 401 may calculate a propagation time between satellite 102 and reference point 405 by calculating distance 406 and dividing it by the speed of like in free space, c, which may be denoted as $T_{g,s}$. This may be the equation $T_{g,s}=d_{g,s}/C$. Distance 403 may be calculated by the UE 401 by using geolocation data of satellite 102 and reference point 405. A total timing advance value TA may be calculated by UE 401 as twice the sum of Tg,s and Ts,u, or: $TA=2(T_{g,s}+T_{s,u2})$. Similar calculations may be performed by other UEs (not shown) in cell 106.

As described in 3GPP TS 38.213 v16.0.0 "Physical layer procedures for control (Release 16)," a subframe number may be converted to a time value by using an offset number $N_{TA,offset}$ and $T_C$. An uplink subframe number for transmission from UE 101 to satellite 102 may be calculated by adding the total timing advance value TA to an offset calculation $N_{TA,offset}*T_C$. For simplicity, $N_{TA,offset}$ may be set to 0 for the descriptions below.

Figure 5:
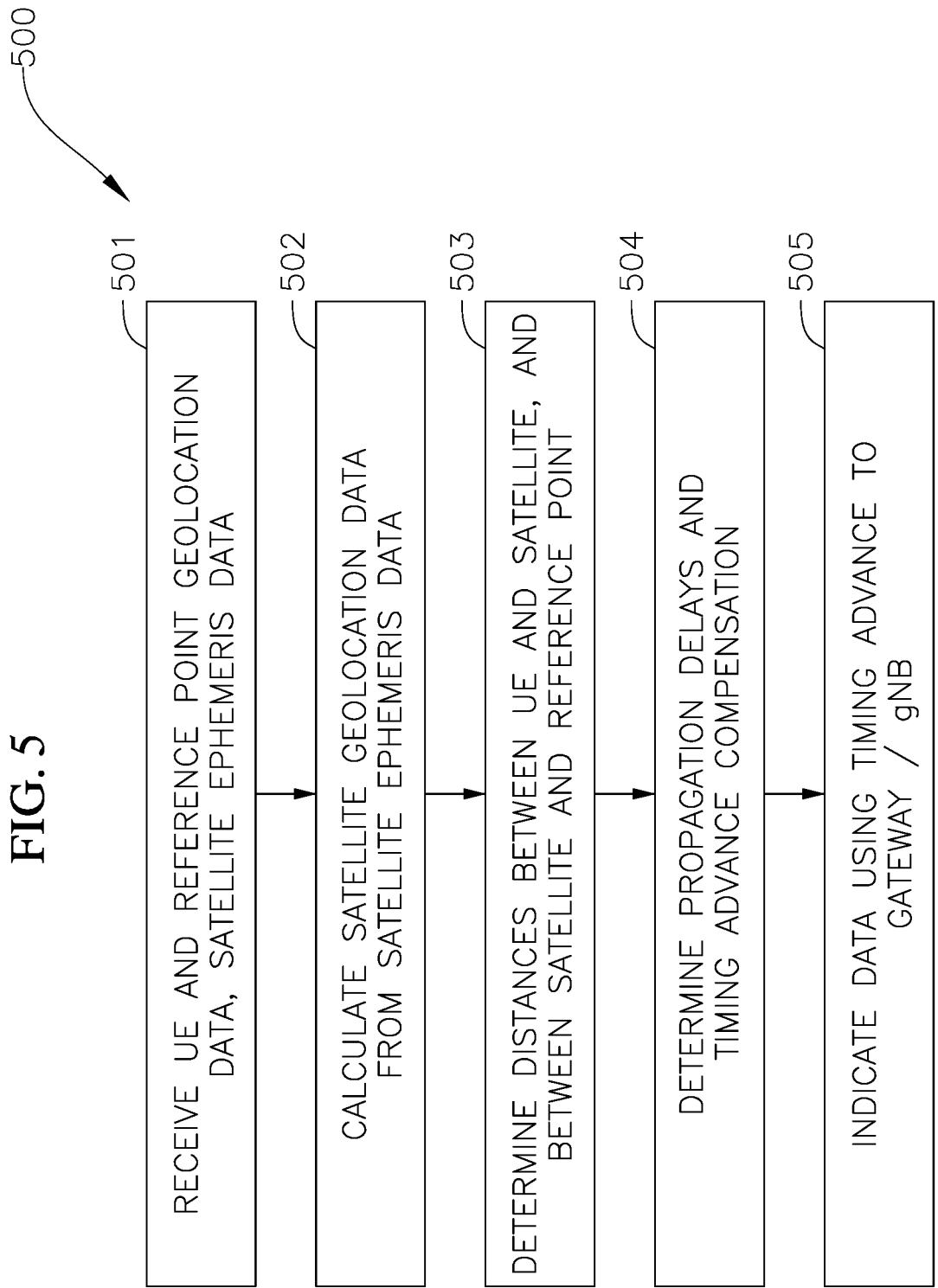
FIG. 5 is a schematic drawing of a process to calculate a timing advance compensation, according to an embodiment of the present disclosure.

Referring to FIG. 5, therein is shown a process diagram 500 for UE 101 of FIG. 1 to calculate a timing advance compensation and indicate the value to gateway 103.

Process 501 may be UE 101 receiving geolocation data of UE 101 and a reference point 405. Geolocation data of UE 101 may be a UE position. In some embodiments, the reference point may be positional data and may be at gateway 103. UE 101 may also receive ephemeris data of satellite 102, which may be satellite position data.

Process 502 may be UE 101 calculating geolocation data of satellite 102 from the ephemeris data.

Process 503 may be UE 101 determining a first distance $d_{s,u}$ between UE 101 and satellite 102 and a second distance $d_{g,s}$ between satellite 102 and the reference point at gateway 103.

Process 504 may be UE 101 determining a second propagation delay $T_{g,s}$ between satellite 102 and the reference point at gateway 103, or $T_{g,s}=d_{g,s}/c$, where c is a speed. In one embodiment, the speed may be the speed of light in free space. UE 101 may determine a first propagation delay $T_{s,u}$ between UE 101 and satellite 102, which may be $T_{s,u}=d_{s,u}/c$. UE 101 may further calculate a timing advance compensation TA as twice the sum of the propagation delays $T_{g,s}$ and $T_{s,u}$, or $TA=2(T_{g,s}+T_{s,u})$.

Process 505 may be UE 101 indicating data using a timing advance compensation to gateway 103. The uplink subframe number for transmission from UE 101 may start at $TA+N_{TA,offset}*T_C$, which may occur before the start of a corresponding downlink subframe at UE 101, as shown in FIG. 2 with UE uplink time 207 occurring before the start of corresponding gateway downlink reference time 202. In one embodiment, UE 101 may use full timing advance compensation, as described in FIG. 2. In another embodiment, UE 101 may use differential timing advance compensation, as described in FIG. 3.

Figure 6:
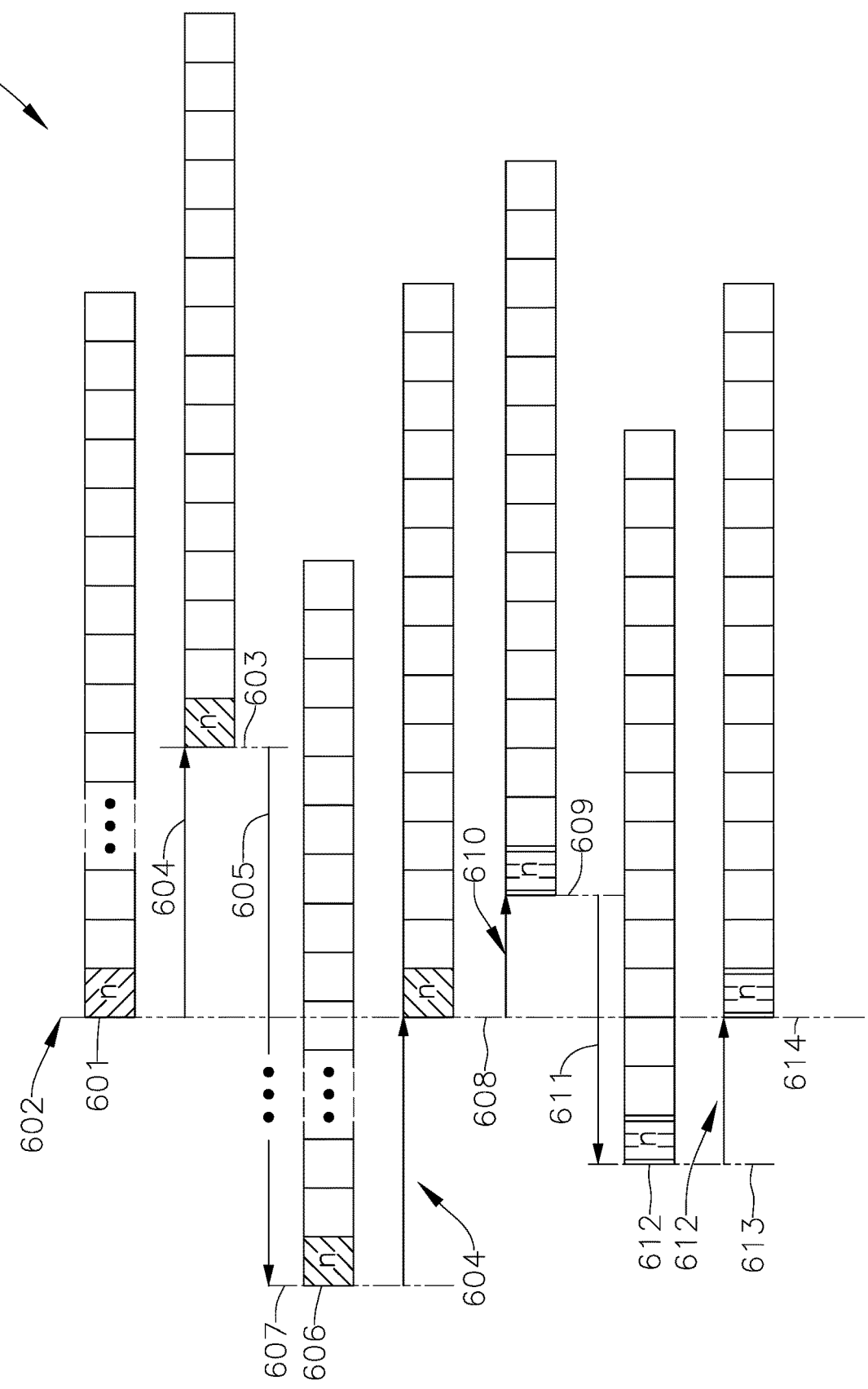
FIG. 6 is a schematic drawing of a timing advance compensation, according to an embodiment of the present disclosure.

Referring to FIG. 6, therein is shown an example embodiment of a full timing advance compensation 600 for two UEs with different propagation delays. A gateway/gNB subframe downlink 601 may be transmitted by gateway 103 at gateway downlink reference time 602 and may be received by a first UE (UE1) at UE 1 downlink time 603. First UE may be UE 101 as shown in FIG. 4. There may be a UE 1 propagation delay 604, which may be the difference between UE 1 downlink time 603 and gateway downlink reference time 602. UE 101 may transmit a subframe uplink 606 at UE 1 uplink time 607, which may be received by gateway 103 at uplink time 608. In one embodiment, with full timing advance compensation, uplink time 608 may be approximately the same as downlink time 602. UE 1 propagation delay 604, which was described previously as the difference between UE 1 downlink time 603 and gateway downlink reference time 602, may be approximately equal to the difference between uplink time 608 and UE 1 uplink time 607. In one embodiment, a UE 1 timing advance 605 may be approximately twice UE 1 propagation delay 604 and may be the round trip time between sending data from gateway 103 downlink to UE 101 and UE 101 sending data uplink to gateway 103.

Meanwhile, gateway/gNB subframe downlink 601 may be transmitted by gateway 103 at gateway downlink reference time 602 may also be received by a second UE (UE2) at UE 2 downlink time 609. UE2 may be UE 401 of FIG. 4.

There may be a UE 2 propagation delay 610, which may be the difference between UE 2 downlink time 609 and gateway downlink reference time 602. UE 401 may transmit a subframe uplink 612 at UE 2 uplink time 613, which may be received by gateway 103 at uplink time 614. In one embodiment, with full timing advance compensation, uplink time 614 may be approximately the same as downlink time 602 and uplink time 608. UE 2 propagation delay 610, which was described previously as the difference between UE 2 downlink time 609 and gateway downlink reference time 602, may be approximately equal to the difference between uplink time 614 and UE 2 uplink time 613. In one embodiment, a UE 12 timing advance 611 may be approximately twice UE 2 propagation delay 610 and may be the round trip time between sending data from gateway 103 downlink to UE 401 and UE 401 sending data uplink to gateway 103.

Figure 7:
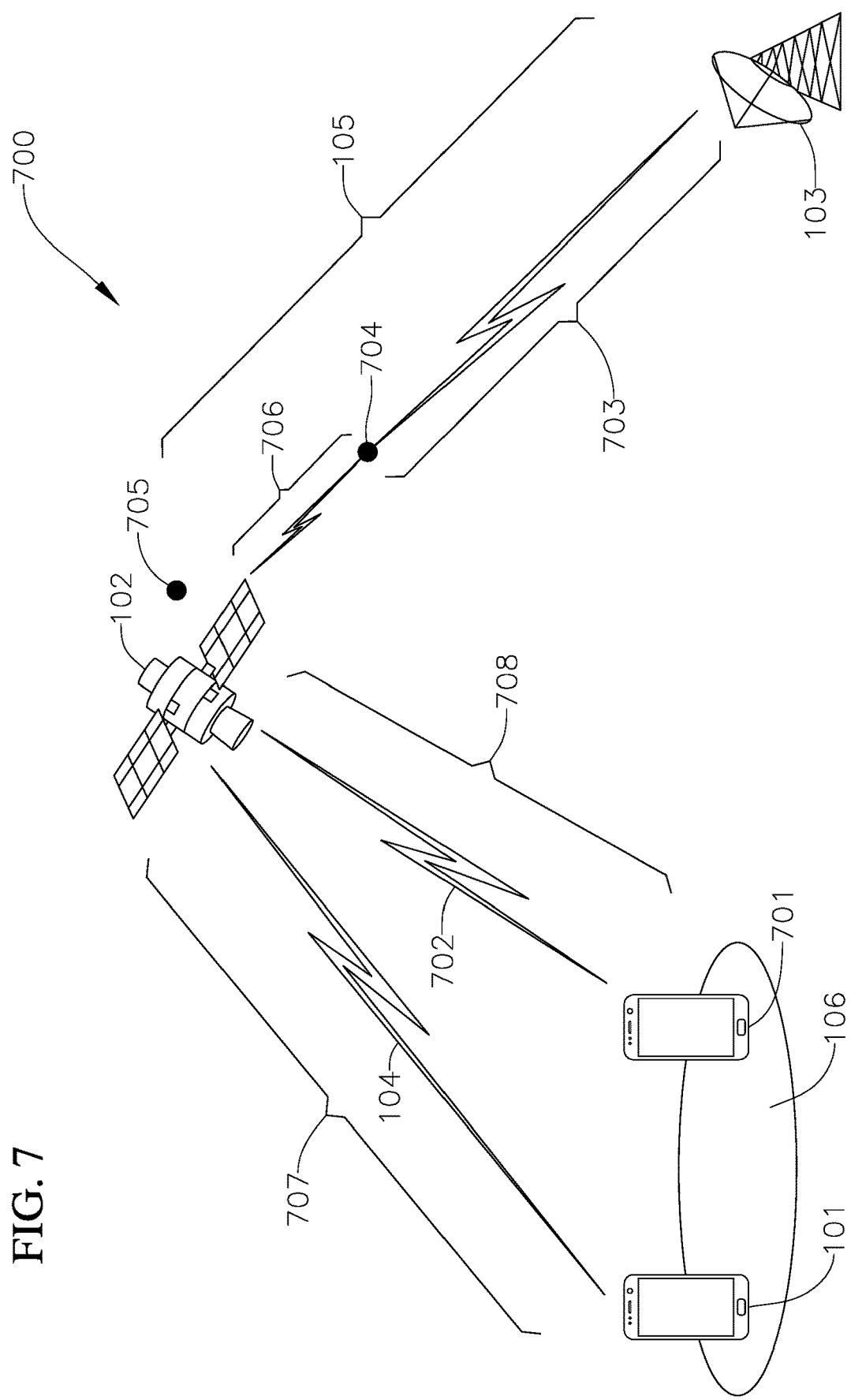
FIG. 7 is a schematic drawing of an NTN, according to an embodiment of the present disclosure.

Referring to FIG. 7, therein is shown an NTN communication architecture 700 for timing advance compensation with a reference point on feeder link 105 of FIG. 1. A UE 701 may be in cell 106 with UE 101 of FIG. 1. UE 701 may have a service link 702 which may have a distance 708 between UE 701 and satellite 102. Feeder link 105 may have a reference point 704 which may be any point on feeder link 105 between satellite 102 and gateway 103. There may be a distance 706 which may be the distance between satellite 102 and reference point 704, which may be referred to as a third distance, and a distance 703 which may be the distance between reference point 704 and gateway 103. Distance 703 may have an associated common timing advance, $T_{common}$. The common timing advance may be a timing advance that is in common between all UEs in cell 106 and the associated gateway 103. In one embodiment, a reference point 705 may be a special case of reference point 704 where the reference point is satellite 102 itself. In another embodiment, reference point 704 may be a point between satellite 102 and gateway 103.

In one embodiment, the network may transmit, or indicate, information to UE 101 to calculate a timing advance. UE 101 may receive GNSS data of UE 101, satellite 102, and reference point 704. Furthermore, UE 101 may also receive common timing advance $T_{common}$. As described in FIG. 4, the distance between UE 101 and satellite 102 may be distance 707, which may be denoted as $d_{s,u}$. Distance 706, the distance between satellite 102 and reference point 704, may be denoted $d_{r,s}$. Reference point 704 may be in the form of ECEF coordinate or any other form of coordinates which may provide the relative location of reference point 704 with respect to a fixed origin point that is known to both the network and UE 101. The reference point 704 geolocation information may also be in the form of an index that points to a location in a table of a set of all predetermined reference points' location information. UE 101 may additionally have ephemeris data for satellite 102 which may be in ECEF Cartesian form, which may include an x, y, and z coordinate as a function of time. UE 101 may be able to calculate the satellite 102 location by any interpolation technique.

UE 101 may calculate a propagation time between UE 101 and satellite 102 by calculating distance 707 and dividing it by a speed. In one embodiment, the speed may be the speed of light in free space, c, which may be denoted as $T_{s,u}$. This may be the equation $T_{s,u}=d_{s,u}/c$. Distance 707 may be calculated by the UE 101 by using geolocation data of UE 101 and satellite 102.

Similarly, UE 101 may calculate a propagation time between satellite 102 and reference point 704 by calculating distance 706 and dividing it by the speed of like in free space, c, which may be denoted as $T_{r,s}$. This may be the equation $T_{r,s}=d_{r,s}/c$ and may be referred to as a third propagation delay.

Distance 706 may be calculated by the UE 101 by using geolocation data of satellite 102 and reference point 704. A total timing advance value TA may be calculated by UE 101 as approximately twice the sum of $T_{r,s}$, $T_{s,u}$, and $T_{common}$, or: TA=2($T_{r,s}$+$T_{s,u}$+$T_{common}$). In one embodiment, this may be timing advance 605 of FIG. 6.

In another embodiment, reference point 704, which may be anywhere between satellite 102 and gateway 103 on feeder link 105, may be replaced with reference point 705, which may be satellite 102 itself. This may be a special case where $T_{r,s}$=0 because $d_{r,s}$=0. In this case, the total timing advance value calculated will be twice the sum of $T_{s,u}$ and $T_{common}$, or: TA=2($T_{s,u}$+$T_{common}$). As mentioned previously, an uplink subframe number for transmission from UE 101 may start with TA+$N_{TA,offset}$*$T_C$ before the start of the corresponding downlink subframe to UE 101, however, this value may be ignored in the figure for simplicity. For example, a UE1 uplink time 602 may occur before a corresponding downlink time 601 in FIG. 6.

Figure 8:
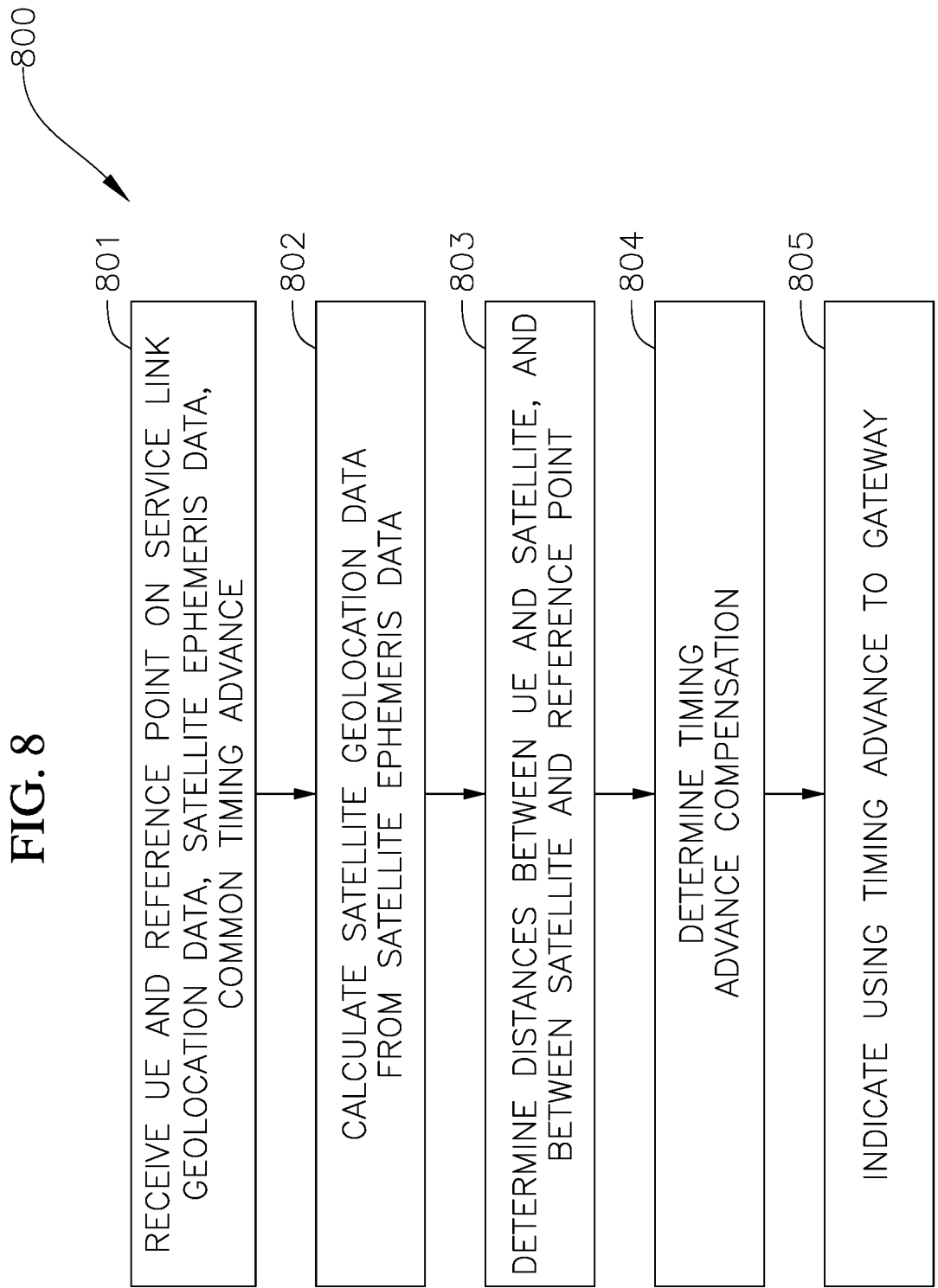
FIG. 8 is a schematic drawing of a process to calculate timing advance compensation, according to an embodiment of the present disclosure.

Referring to FIG. 8, this may be a process diagram for calculating and indicating a timing advance of a UE 101 utilizing NTN architecture 700 as shown in FIG. 7. Unlike previous timing advance calculations, this timing advance calculation may utilize a reference point 704 of FIG. 7 and common timing advance.

Process 801 may be UE 101 receiving geolocation data of UE 101, ephemeris data of satellite 102, geolocation data of reference point 704, and a common timing advance 703. In some embodiments, UE 101 may receive geolocation or ephemeris data of reference point 705 instead of reference point 704 if satellite 102 is selected as a reference point. In some embodiments, reference point 704 may be on the path of feeder link 105 between satellite 102 and gateway 103.

Process 802 may be UE 101 calculating a geolocation of satellite 102 with the ephemeris data of satellite 102.

Process 803 may be UE 101 determining distance $d_{s,u}$ between UE 101 and satellite 102 and a distance $d_{r,s}$ between satellite 102 and reference point 704. In some embodiments, if satellite 102 is used as a reference point 705, UE 101 may only determine the distance between UE 101 and satellite 102.

Process 804 may be UE 101 determining a differential timing advance and then full timing advance compensation TA. UE 101 may calculate a timing advance between UE 101 and satellite 102 $T_{s,u}$ which may be distance $d_{s,u}$ divided by a speed. In one embodiment, the speed may be the speed of light in free space, c, or $T_{s,u}=d_{s,u}/c$. UE 101 may determine a timing advance between satellite 102 and reference point 704 $T_{r,s}$ which may be distance $d_{r,s}$ divided by the speed, c, or $T_{r,s}=d_{r,s}/C$. UE 101 may calculate TA as twice the sum of $T_{r,s}$, $T_{s,u}$, and $T_{common}$, or TA=2($T_{r,s}$+$T_{s,u}$+$T_{common}$).

Process 805 may be UE 101 transmitting, or indicating, data using a full timing advance compensation TA to gateway 103. In one embodiment, UE 101 may apply full timing advance to uplink subframes, where TA=2($T_{r,s}$+$T_{s,u}$+$T_{common}$), as described above. In on embodiment, satellite 102 may be used as reference point 705, and $T_{r,s}$=0. Satellite 102 geolocation data extracted from ephemeris data and reference point 705 geolocation data may be the same, and TA=2($T_{s,u}$+$T_{common}$). The uplink subframe number for transmission from UE 101 to gateway 103 may be TA+$N_{TA,offset}$*$T_C$, which may be sent before the start of the corresponding downlink subframe at UE 101. This may be shown in FIG. 6, where $N_{TA,offset}$=0 for simplicity.

Figure 9:
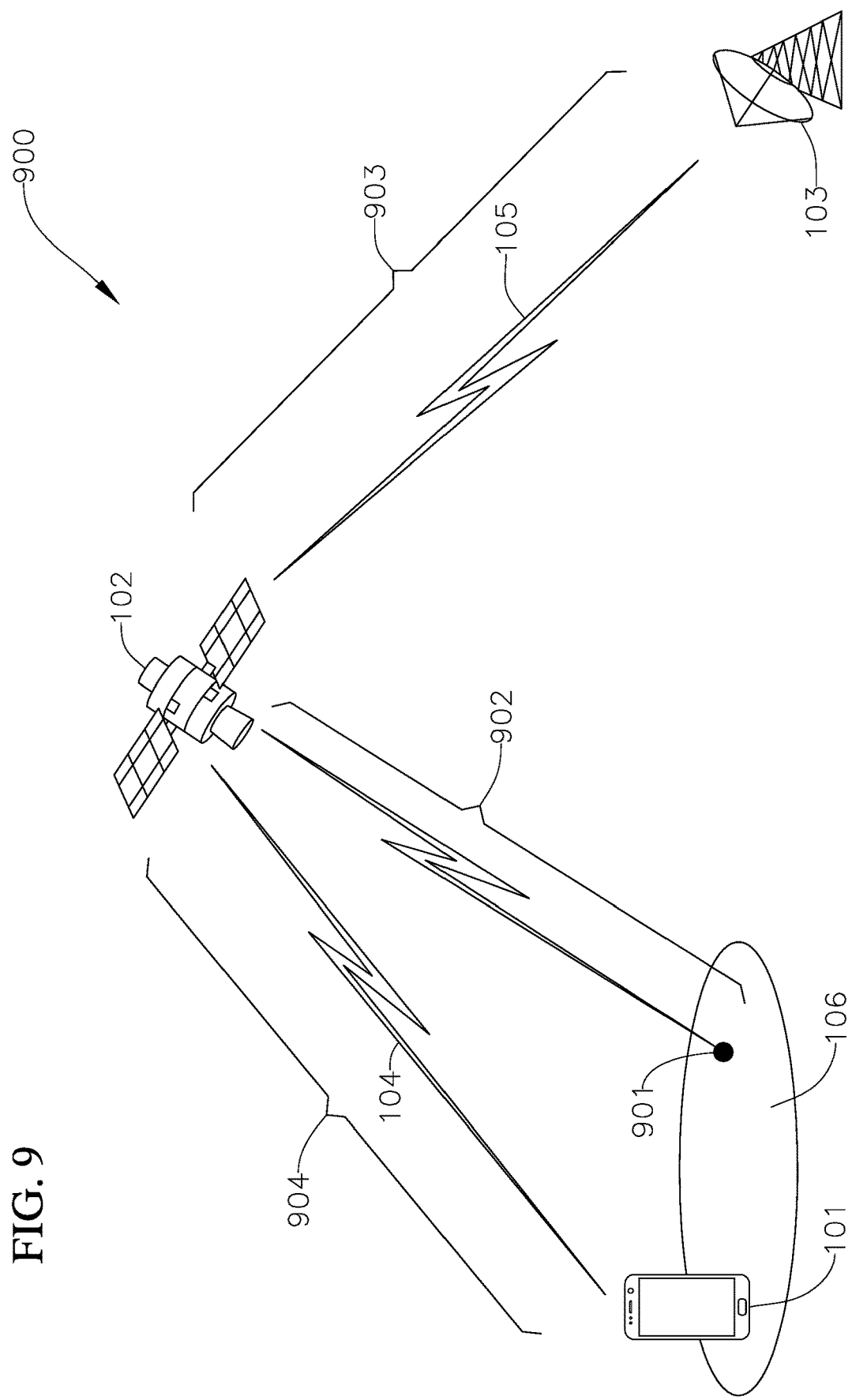
FIG. 9 is a schematic drawing of an NTN, according to an embodiment of the present disclosure.

Referring to FIG. 9, this may be an example NTN communication architecture 900 for timing advance compensation with a reference point 901 on the footprint of satellite 102. Unlike in previous examples, in the present example, reference point 901 may be anywhere satellite 102 can communicate with. In one embodiment, reference point 901 may be within the geographic area of cell 106. Reference point 901 may have a distance $d_{r,s}$ which may be the distance between reference point 901 and satellite 102. There may be a common timing advance 903 $T_{common}$ which may be the timing advance between satellite 102 and gateway 103. As described previously, UE 101 may receive geolocation data for gateway 103, and may receive ephemeris data from satellite 102 which can be used by UE 101 to calculate geolocation data for satellite 102. UE 101 may be able to calculate a distance 902, $d_{r,s}$, which may be the distance between reference point 901 and satellite 102 and may be referred to as a fourth distance. Additionally, UE 101 may be able to calculate distance 904, $d_{s,u}$, which may be the distance of service link 104, or the path between UE 101 and satellite 102.

After receiving geolocation data of reference point 901, ephemeris data of satellite 102, and common timing advance 903, UE 101 may be able to calculate the propagation time between reference point 901 and satellite 102, $T_{r,s}$, which may be a fourth propagation delay, and the propagation time between UE 101 and satellite 102, $T_{s,u}$. These propagation times may be calculated by dividing the distance by the speed of light in free space, c. Thus, $T_{r,s}=d_{r,s}/c$, and $T_{s,u}=d_{s,u}/c$. UE 101 may calculate a differential timing advance as twice the difference between $T_{s,u}$ and $T_{r,s}$, or TA=2($T_{s,u}-T_{r,s}$).

Figure 10:
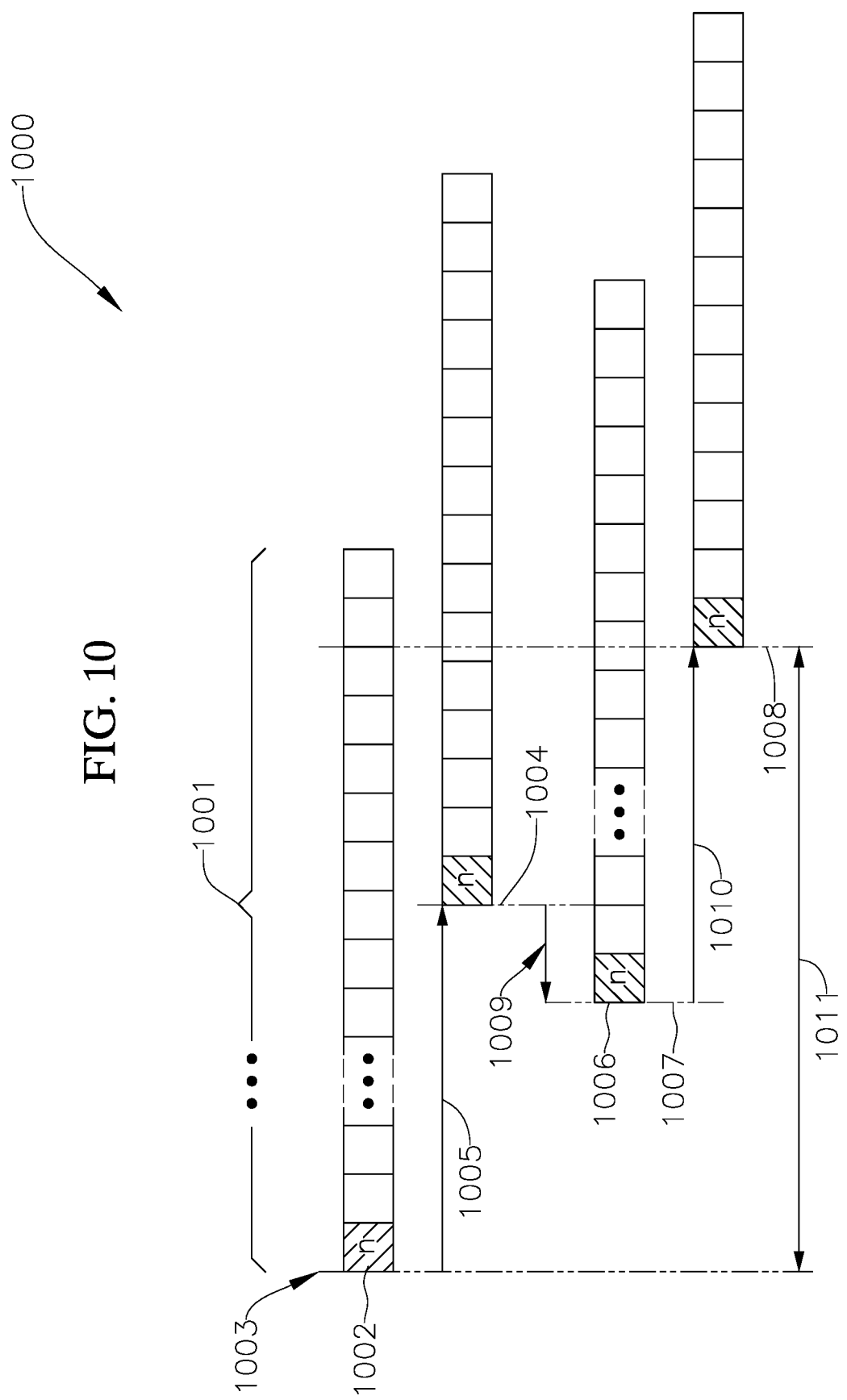
FIG. 10 is a schematic drawing of a differential timing advance compensation, according to an embodiment of the present disclosure.

Referring to FIG. 10, therein is shown a differential timing advance compensation 1000 for a downlink and uplink to a base station, such as a gNB, via gateway 103 of FIG. 1. In one embodiment, differential timing advance compensation 1000 may utilize the NTN architecture 900, however, it may also use other NTN architectures, such as NTN architecture 700, NTN architecture 400, NTN architecture 100, or others not shown.

Subframes 1001 may comprise multiple subframes of data. Each subframe may be the same number of bits or a different number, and may be used to transmit and receive data between a base station via gateway 103 and a UE 101 of FIG. 1.

A subframe 1002 may be within subframes 1001. In one embodiment, subframe 1002 may transmit downlink data from gateway 103 to UE 101 at a gateway downlink reference time 1003, which may be received by UE 101 at a UE downlink reference time 1004. There may be a downlink propagation time 1005, which may be the difference between UE downlink reference time 1004 and gateway downlink reference time 1003.

Meanwhile, UE 101 may send a subframe 1006 uplink to gateway 103 at a UE uplink reference time 1007. Subframe 1006 may arrive at gateway 103 at gateway uplink reference time 1008 with an uplink propagation delay 1010. In one embodiment, uplink propagation delay 1010 may be approximately the same time as downlink propagation delay 1005. UE uplink reference time 1007 may be determined by subtracting a differential timing advance 1009 from UE downlink reference time 1004. Differential timing advance 1009 may be different for each UE 101 used, or it may be the same for two or more UEs. In one embodiment, differential timing advance 1009 may be calculated as described in FIG. 9, as TA=2($T_{s,u}-T_{r,s}$), however, other differential timing advance calculations may be used.

In one embodiment, for calculating differential timing advance 1009, the information about the propagation delay $T_{r,s}$ may be broadcasted in cell 106 and sent to all UEs in cell 106. Broadcasting may be performed via system information block (SIB), master information block (MIB), or any other method. The information about propagation delay $T_{r,s}$ may be an absolute time or may be normalized to Tc, such as $N_{r,s}=T_{r,s}/T_C$. UE 101 may determine an uplink subframe number for transmission to gateway 103, which may be $T_{s,u}+(N_{r,s}+N_{TA,offset})*T_C$, which may be before the start of a corresponding downlink subframe at UE 101. The uplink subframe number may be sent at UE uplink reference time 1007. In one embodiment, all uplink subframes from UEs in cell 106 may arrive at gateway 103 by a delay of 2($T_{common}+T_{r,s}$), which may be a common timing advance 1011. Common timing advance 1011 may allow for gateway 103 to receive all uplink transmissions from all UEs in cell 106 at the same gateway uplink reference time 1008. Thus, for each UE in cell 106, there may be a different differential timing advance 1009, however, each uplink transmission for each UE in cell 106 may arrive at the same time to gateway 103.

Figure 11:
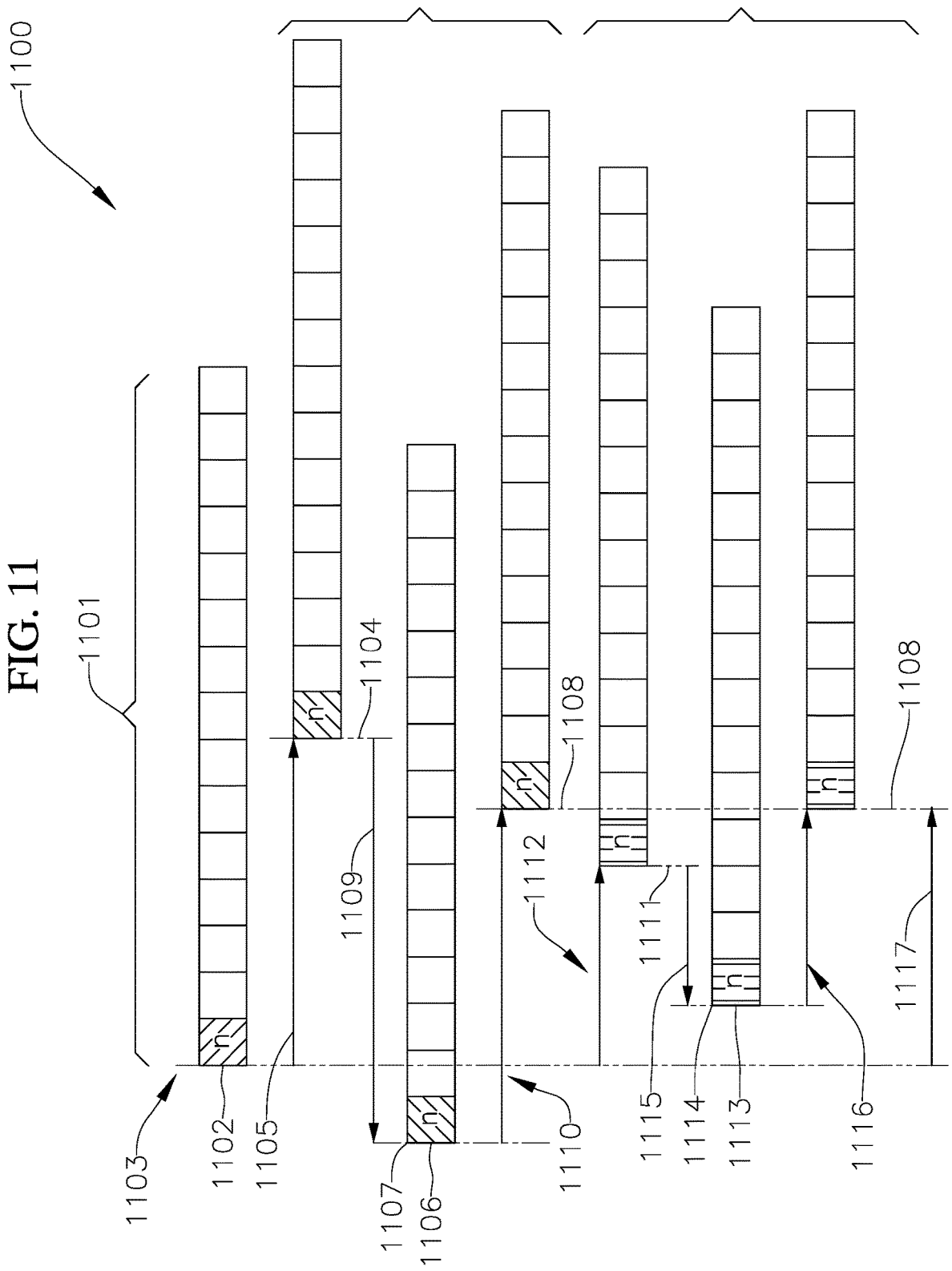
FIG. 11 is a schematic drawing of a differential timing advance compensation, according to an embodiment of the present disclosure.

Referring to FIG. 11, therein is shown a timing diagram 1100 for differential timing advance compensation for two UEs for a downlink and uplink to a base station, such as a gNB, via gateway 103 of FIG. 1. In one embodiment, timing diagram 1100 may utilize NTN architecture 900, however, it may also use other NTN architectures. Subframes 1101 may comprise multiple subframes of data. Each subframe may be the same number of bits or a different number, and may be used to transmit and receive data between a base station via gateway 103 and a UE 101 of FIG. 1.

A subframe 1102 may be within subframes 1101. In one embodiment, subframe 1102 may transmit data downlink from gateway 103 to UE 101 at a gateway downlink reference time 1103, which may be received by UE 101 at a UE1 downlink reference time 1104. There may be a UE1 downlink propagation time 1105, which may be the difference between UE1 downlink reference time 1104 and gateway downlink reference time 1103.

Meanwhile, UE 101 may send a UE1 subframe 1106 uplink to gateway 103 at a UE1 uplink reference time 1107. UE1 subframe 1106 may arrive at gateway 103 at gateway uplink reference time 1108 with a UE1 uplink propagation delay 1110. In one embodiment, UE1 uplink propagation delay 1110 may be approximately the same time as UE1 downlink propagation delay 1005. UE1 uplink reference time 1107 may be determined by subtracting a UE1 differential timing advance 1109 from UE1 UE downlink reference time 1104. UE1 Differential timing advance 1109 may be specific to a UE 101 used. In one embodiment, UE1 differential timing advance 1109 may be calculated as described in FIG. 9, as TA=2($T_{s,u}-T_{r,s}$), however, other differential timing advance calculations may be used.

Meanwhile, subframe 1102 may be received by a second UE (UE2) at UE2 downlink reference time 1111. There may be a UE2 downlink propagation delay 1112, which may be the difference between UE2 downlink reference time 1111 and gateway downlink reference time 1103. UE2 may transmit, or indicate, a UE2 subframe 1113 at UE2 uplink reference time 1114, which may be received by gateway 103 at gateway uplink reference time 1108. The propagation delay between UE2 uplink reference time 1114 and gateway uplink reference time 1108 may be UE2 uplink propagation delay 1116. In a differential timing advance compensation mode, gateway 103 may send data downlinks at a first reference time and may receive data uplinks at a second reference time. That is, the downlink and uplink reference times may differ. In a full timing advance compensation mode, gateway 103 may send data downlinks and may receive data uplinks at the same reference time. FIG. 11 shows an example of a differential timing advance compensation scheme where a UE1 and a UE2 are indicating data uplink to gateway 103 at different times, however, the data may be received by gateway 103 at the same time, which may be gateway uplink reference time 1108.

Figure 12:
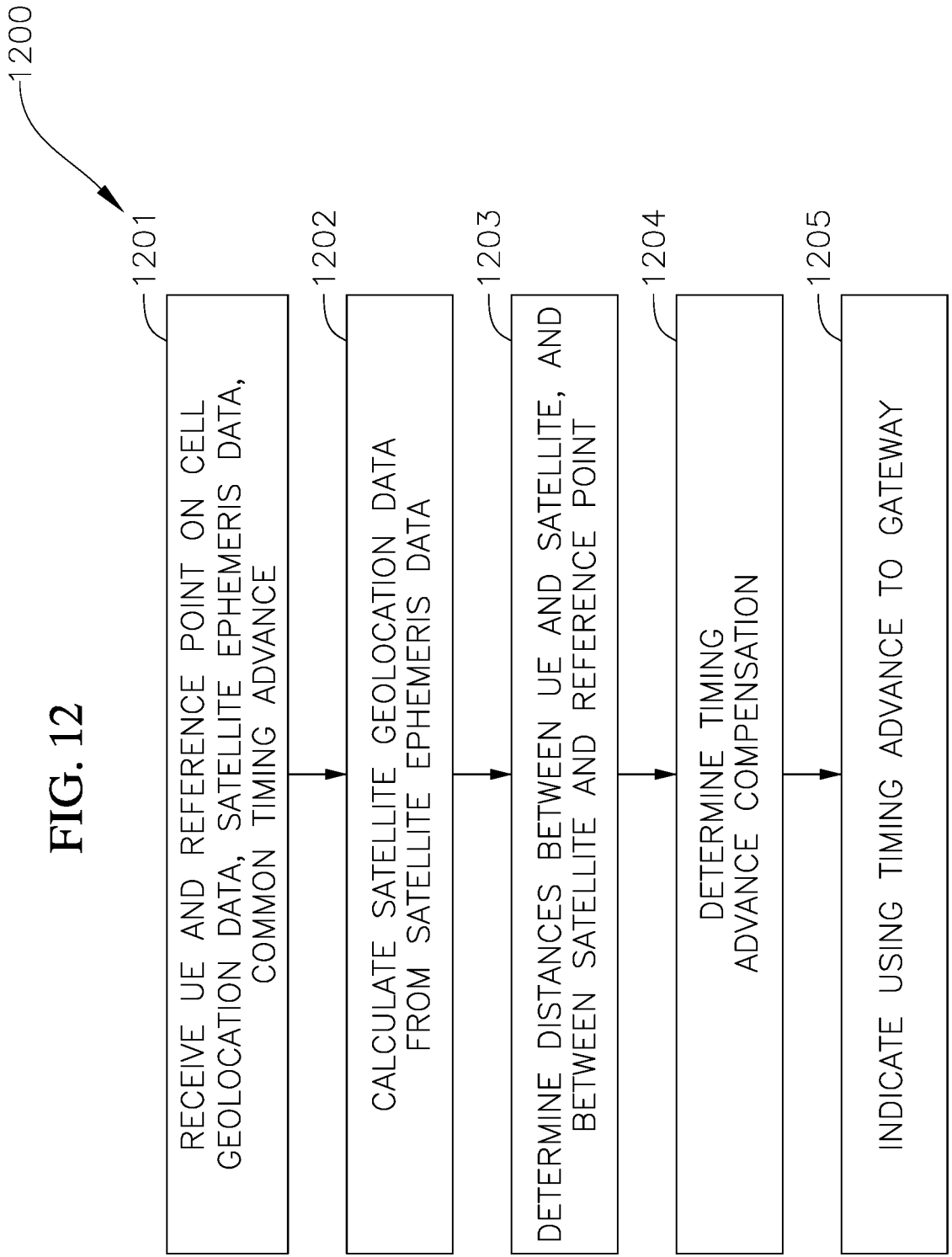
FIG. 12 is a schematic drawing of a process to calculate timing advance compensation, according to an embodiment of the present disclosure.

Referring to FIG. 12, this may be a process diagram 1200 for calculating and indicating a timing advance of a UE 101 with a reference point 901 of FIG. 9 anywhere in cell 106. Unlike in previous figures, FIG. 12 may use a difference between a propagation delay between a UE 101 and satellite 102 and a propagation delay between a reference point 901 and satellite 102 to determine a timing advance.

Process 1201 receive data may be UE 101 receiving geolocation data of UE 101, ephemeris data of satellite 102, geolocation of reference point 901, and a common timing advance 903. In some embodiments, reference point 901 may be a point anywhere within cell 106. In some embodiments, UE 101 may receive data from a gNB via gateway 103 in NTN architecture 900. In another embodiment, information about the propagation delay $T_{r,s}$ between reference point 901 and satellite 102 may be broadcasted by satellite 102 into cell 106 and all UEs in cell 106 may receive this information. Broadcasting may occur via SIB, MIB, or other broadcasting mechanism.

Process 1202 may be UE 101 calculating a geolocation of satellite 102 using the ephemeris data of satellite 102.

Process 1203 may be UE 101 calculating a distance $d_{s,u}$ between UE 101 and satellite 102, and a distance $d_{r,s}$ between satellite 102 and reference point 901.

Process 1204 may be UE 101 determining a timing advance. UE 101 may calculate a propagation time $T_{s,u}$ between UE 101 and satellite 102, which may be $T_{s,u}=d_{s,u}/c$, where c is the speed of light in free space. UE 101 may calculate a propagation time $T_{r,s}$ between satellite 102 and reference point 901, which may be $T_{r,s}=d_{r,s}/C$. UE 101 may calculate a differential timing advance value TA as twice the difference between propagation time $T_{s,u}$ and propagation time $T_{r,s}$, or $TA=2(T_{s,u}-T_{r,s})$.

In some embodiments, UE 101 may determine a full timing advance. In other embodiments, UE 101 may determine a differential timing advance. For each UE in cell 106, the differential timing advance may be unique to the UE, or it may be shared.

Process 1205 may be UE 101 transmitting, or indicating, data using a timing advance to gateway 103. The uplink subframe number for transmission from UE 101 may start at $TA+N_{TA,offset}*T_C$, which may be transmitted before the start of the corresponding downlink subframe at UE 101. The information may be in the form of an absolute time $T_{r,s}$ or may be normalized to $T_C$. For example, the uplink subframe number may be normalized to $N_{r,s}=T_{r,s}/T_C$. In the normalization approach, UE 101 may calculate $T_{s,u}$. The uplink subframe number for transmission from UE 101 may start with $T_{s,u}+(N_{r,s}+N_{TA,offset})*T_C$ which may be before the start of the corresponding downlink subframe at UE 101, as shown in FIG. 10. In FIG. 10, $N_{TA,offset}=0$ for simplicity. Uplink subframes from all UEs in cell 106 may arrive at gateway 103 by a delay of $2(T_{common}+T_{r,s})$ which may be known to gateway 103.

Figure 13:
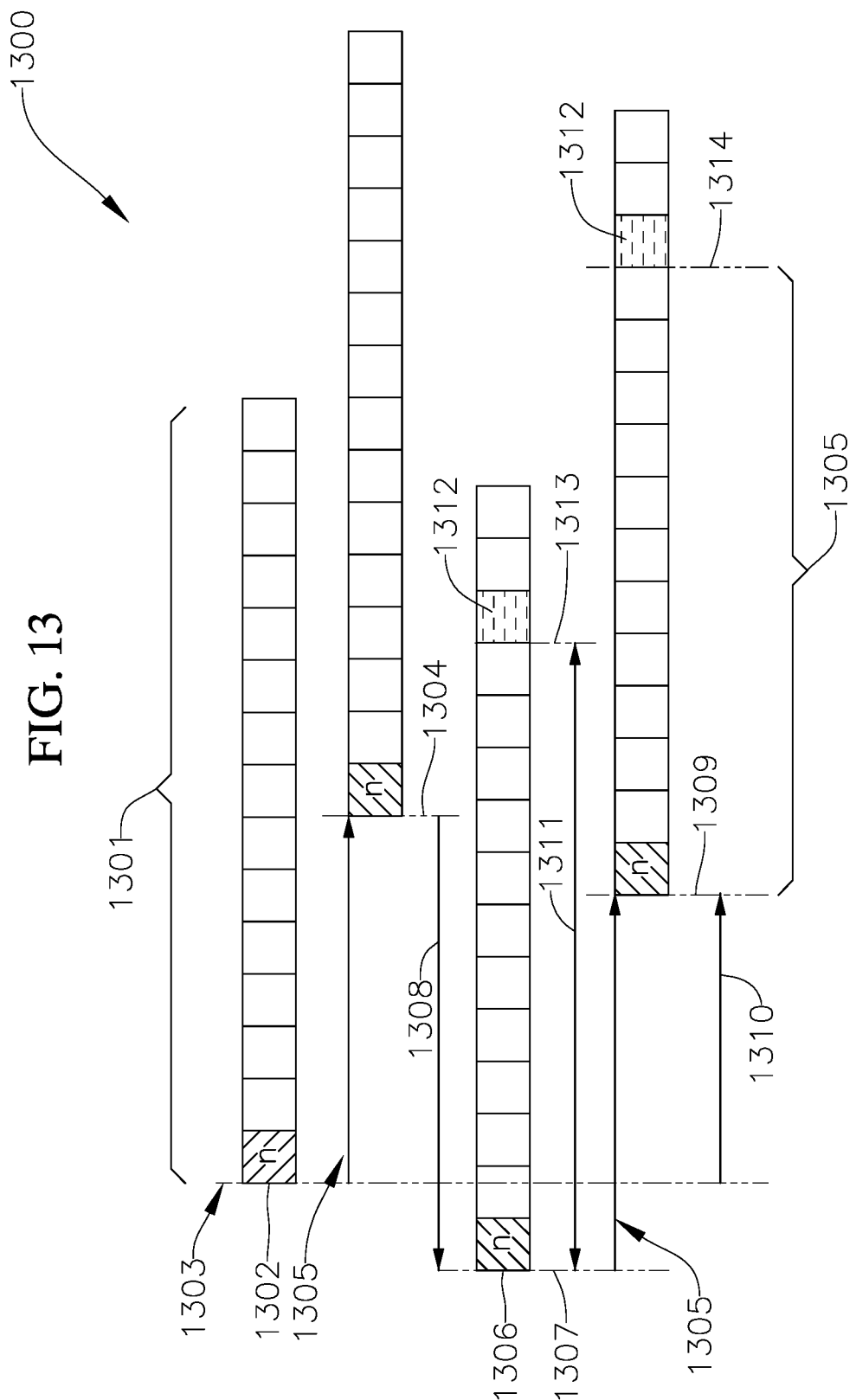
FIG. 13 is a schematic drawing of a timing offset, according to an embodiment of the present disclosure.

Referring to FIG. 13, therein is shown an example timing offset diagram 1300 for an offset value $K_{offset}$ added to a timing relationship in an NTN architecture, such as NTN communication architecture 100 of FIG. 1. A $K_{offset}$ value may be used in any timing relationship, such as uplink or downlink communication between a gateway 103 and a UE 101. A $K_{offset}$ value may be an offset value added to an existing NR timing relationship between downlink and uplink transmission. In one embodiment, $K_{offset}$ may be applied at the slot level within a subframe, however, it may also be applied to subframes or to frames. For example, a gNB via gateway 103 may send commands downlink to UE 101 of FIG. 1 at a specified slot n. UE 101 may then respond with an uplink transmission at a slot $n+k2+K_{offset}$, where k2 may be a pre-defined value. If n=100, k=16, and $k_{offset}=200$, then UE 101 may transmit uplink at slot 100+16+200=316.

Due to propagation delays in NTN, NR timing relationships involving downlink and uplink timing interaction may be modified and enhanced. Existing NR timing relationships may use several Radio Resource Control (RRC) standard configuration parameters, such as $K_1$ and $K_2$, for different downlink-uplink interactions to establish a timing relationship between a gateway 103/gNB and a UE 101. The range of existing RRC parameters may not compensate for NTN timing advance values, and therefore, a $K_{offset}$ value may be added to the downlink-uplink timing interaction for NTN.

Subframes 1301 may comprise multiple subframes, which may be divided into equally sized subframes. Each subframe may be the same duration or a different duration, and may be used to transmit and receive data between a base station or gNB via gateway 103 and a UE 101 of FIG. 1.

A subframe 1302 may be within subframes 1301. In one embodiment, subframe 1302 may transmit data downlink from gateway 103 to UE 101 at a gateway downlink reference time 1303, which may be received by UE 101 at a UE downlink reference time 1304. There may be a slot number associated with gateway downlink reference time 1303 and there also may be a slot number associated with UE downlink reference time 1304. There may be a UE propagation delay 1305, which may be the difference between UE downlink reference time 1304 and gateway downlink reference time 1303.

Meanwhile, UE 101 may send a subframe 1306 uplink to gateway 103 at UE uplink reference time 1307. Subframe 1306 may arrive at gateway 103 at gateway uplink reference time 1309 with a UE propagation delay 1305. UE uplink reference time 1307 may be determined by subtracting a UE timing advance 1308 from UE downlink reference time 1304. It one embodiment, differential timing advance compensation may be employed, however, full timing advance compensation may also be employed, using any of the previously described methods. In one embodiment, the difference between gateway uplink reference time 1309 and gateway downlink reference time 1303 may be twice a common timing advance $T_{common}$, however, any other timing advance may be used.

Meanwhile, a second subframe 1312 may be sent uplink to gateway 103 at a second UE uplink reference time 1313 and may arrive at gateway 103 at a second gateway uplink reference time 1314. The time delay between second gateway uplink reference time 1314 and second UE uplink reference time 1313 may be UE propagation delay 1305. Second UE uplink reference time 1313 may be calculated by adding a NR timing with $K_{offset}$ time 1311 to UE uplink reference time 1307. In one embodiment, NR timing with $K_{offset}$ time 1311 may be selected by a gNB via gateway 103 to be greater than the value of UE timing advance 1308. In one embodiment, $K_{offset}$ may be the same or larger than the value of UE timing advance 1308.

In one embodiment, each UE in a cell 106 of FIG. 1 may receive a UE-specific $K_{offset}$ value from the network. In another embodiment, one $K_{offset}$ value may be used for all UEs in cell 106. A dedicated Downlink Control Information (DCI) format may be defined to send a $K_{offset}$ value to each UE, which may be referred to as a group-common DCI format for configuring $K_{offset}$. In one embodiment, a dedicated Radio Network Temporary Identifier (RNTI) may also be defined to send a $K_{offset}$ value to each UE.

In one embodiment, a DCI format, such as DCI format 2_0 or 2_4, may be defined and used to provide $K_{offset}$ values to UEs in a cell 106, however, any DCI format standard may be used. In another embodiment, a dedicated RNTI, specified as K-RNTI, may also be used to scramble the DCI format. A UE may be addressed by its K-RNTI when receiving a DCI format. The UE may be addressed by using the K-RNTI to scramble the Cyclic Redundancy Check (CRC) bits, which may be added to the DCI payload. The UE may be configured with a K-RNTI by using a downlink parameter configuration.

Figure 14:
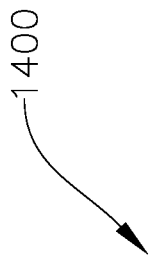
FIG. 14 is a schematic drawing of a group-common Downlink Control Information (DCI) format for receiving an offset value, according to an embodiment of the present disclosure.
Figure 15:
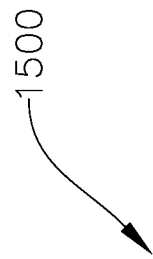
FIG. 15 is a schematic drawing of a Medium Access Control-Control Element (MAC-CE) format for receiving an offset value, according to an embodiment of the present disclosure.

Referring to FIG. 14, a group-common DCI format for configuring $K_{offset}$ therein is shown. In one embodiment, $K_{offset}$ may be specific to each UE in a cell 106. In another embodiment, a dedicated DCI format may also be used for UE group common signaling, such that multiple UEs may be allocated the same K-RNTI. Multiple EUs may decode the same physical downlink control channel (PDCCH), however, each UE may only extract information addressed to the specific UE. The UE may be provided with an index or position ID information using a downlink parameter configuration. The index or position ID may transmit, or indicate, a starting position of the information relevant to the UE. As seen in FIG. 15, a DCI structure may contain n $K_{offset}$ values within the DCI and each $K_{offset}$ value may occupy b bits. The number of bits, b, may be extracted from the DCI payload based on the range of $K_{offset}$. The value of b may be network- or cell-specific. All UEs of a network or cell within a network, such as cell 106, may be configured with the same value of b. The maximum size of the DCI may be network- or cell-specific. The UE may be informed of the actual size of the DCI via an information element. The UE may apply the UE-specific $K_{offset}$ to all of its associated downlink-uplink timing relationships, which will be described in more detail later.

Referring to FIG. 15, therein is shown an example for $K_{offset}$ indication using Medium Access Control-Control Element (MAC-CE). $K_{offset}$ may occupy m bytes. The network may configure all UEs, such as UEs in cell 106, by a value for m, which may be the number of bytes used to transmit, or indicate, the value of $K_{offset}$. The network may then use a MAC-CE and a corresponding logical channel identity to configure UEs separately for UE-specific $K_{offset}$ values.

In another embodiment, $K_{offset}$ may be transmitted, or indicated, to a UE per-transmission in a DCI or RAR grant, during the scheduling procedure. The $K_{offset}$ value may be indicated depending on a downlink-uplink timing relationship. These various relationships may be described below.

In one embodiment, $K_{offset}$ may be based on timing for Physical Uplink Shared Channel (PUSCH) transmission that is scheduled by a DCI. In, NR, when a UE is scheduled to transmit PUSCH by a DCI, the DCI may transmit, or indicate, a slot offset value $K_2$ as mentioned previously. For an NTN or scenarios where a satellite 102 of FIG. 1 is used in a network, $K_{offset}$ may be transmitted in the DCI as a new field. The slot allocated for the PUSCH may be $$\left\lfloor n \cdot \frac{2^{\mu_{PUSCH}}}{2^{\mu_{PDCCH}}} \right\rfloor + K_2 + K_{offset},$$

where n may be the slot number of the scheduling DCI, $K_2$ may be based on the numerology of PUSCH, $K_{offset}$ may be based on the UE's timing advance and $\mu_{PUSCH}$ and $\mu_{PDCCH}$ may be the subcarrier spacing configurations for PUSCH and PDCCH, respectively.

In another embodiment, $K_{offset}$ may be based on timing for Configured Grant Type 2, which may follow the same rules described above for timing for PUSCH transmission that is scheduled by a DCI.

In another embodiment, $K_{offset}$ may be based on timing for Channel State Information (CSI) transmission on PUSCH. The transmission timing of CSI on PUSCH may follows the same rules mentioned for PUSCH transmission that may be scheduled by a DCI, in the paragraph above.

In another embodiment, $K_{offset}$ may be based on timing for PUSCH transmission that is scheduled by a RAR grant. If a UE receives a PDSCH with a RAR message in slot n for a corresponding physical random access channel (PRACH) transmission from the same UE, then the UE may transmit the PUSCH in slot $n+K_2+K_{offset}+\Delta$, where $K_{offset}$ may be based on the UE's timing advance and may be indicated in the RAR grant. $K_2$ and $\Delta$ may be defined and provided in 3GPP TS 38.214 v16.0.0, "Physical layer procedures for data (Release 16).

In another embodiment, $K_{offset}$ may be based on timing for Hybrid Automatic Repeat Request Acknowledgement (HARQ-ACK) transmission on Physical Uplink Control Channel (PUCCH). With reference to slots for PUCCH transmissions, for a Physical Downlink Shared Channel (PDSCH) reception in slot n or a Semi Persistent Scheduling (SPS) PDSCH release through a PDCCH reception in slot n, the UE may provide corresponding HARQ-ACK information in a PUCCH transmission within slot $n+K_1+K_{offset}$ where $K_{offset}$ may be indicated in the DCI, $K_1$ may be a number of slots and may be indicated by the PDSCH-to-HARQ-timing-indicator field in the DCI format.

In another embodiment, $K_{offset}$ may be based on timing for CSI reference resource transmission. The CSI reference resource for a CSI report in uplink slot n may be defined by a single downlink slot $$\left\lfloor n \cdot \frac{2^{\mu_{DL}}}{2^{\mu_{UL}}} \right\rfloor - n_{CSI_{ref}} - K_{offset},$$

where $\mu_{DL}$, and $\mu_{UL}$ may be the subcarrier spacing configurations for DL and UL, respectively. The value of $n_{csi\_ref}$ may be defined in 3GPP TS 38.214 v16.0.0, "Physical layer procedures for data (Release 16). For aperiodic CSI reporting, the UE may be indicated by the DCI to report CSI and $K_{offset}$ may be based on the UE's timing advance and may be included in the DCI.

In another embodiment, $K_{offset}$ may be based on timing for aperiodic Sounding Reference Signal (SRS) transmission. If a UE receives a DCI triggering aperiodic SRS in slot n, the UE may transmit aperiodic SRS in each of the triggered SRS resource sets in slot $$\left\lfloor n \cdot 2^{\frac{\mu_{SRS}}{\mu_{PDCCH}}} \right\rfloor + k + K_{offset},$$

where $K_{offset}$ may be based on the UE's timing advance and may be included in the DCI triggering aperiodic SRS, k may be configured via higher layer parameter slotOffset for each triggered SRS resources set, $\mu_{SRS}$ and $\mu_{PDCCH}$ may be the subcarrier spacing configurations for triggered SRS and PDCCH carrying the triggering command, respectively.

In another embodiment, $K_{offset}$ may be based on timing for a MAC control element action. When a PDSCH carries a MAC control element (MAC-CE) command, and the corresponding HARQ-ACK is transmitted in slot n, the corresponding action and the UE assumption on the downlink configuration indicated by the MAC-CE command may be applied starting from the first slot that is after slot $n+d_{UE} \cdot N_{slot}^{subframe, \mu}+K_{offset}$, where $N_{slot}^{subframe,\mu}$ may be the number of slots per subframe for subcarrier spacing configuration μ, and $d_{UE}$ may both be an integer that depends on the UE capability. The value for $K_{offset}$ may be indicated to the UE in the MAC-CE command.

Figure 16:
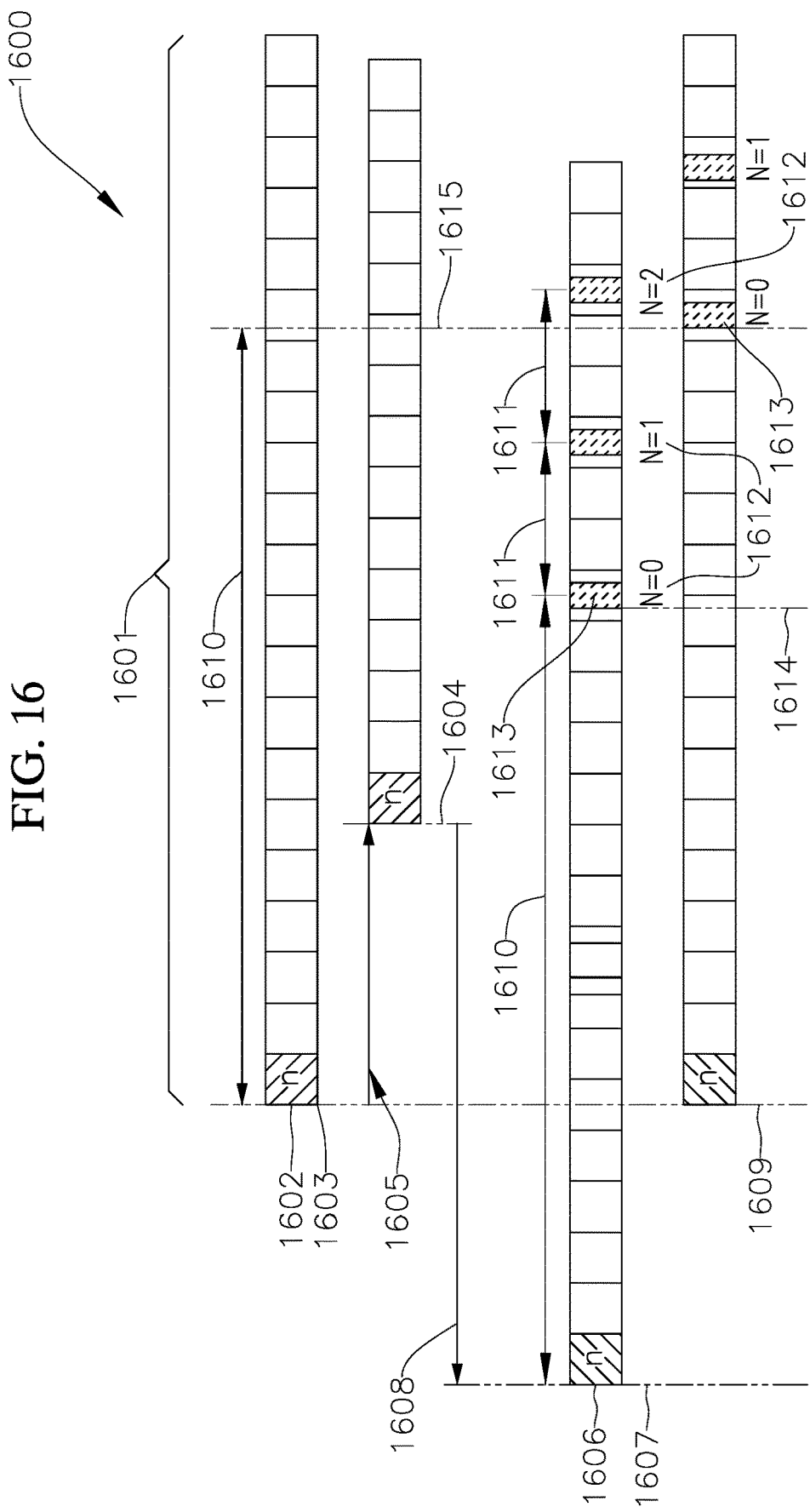
FIG. 16 is a schematic drawing of an offset timing for Configured Grant Type 1, according to an embodiment of the present disclosure.

In another embodiment, $K_{offset}$ may be based on timing for Configured Grant Type 1, referring to FIG. 16. FIG. 16 may depict a timing offset diagram 1600 for Grant Type 1. Subframes 1601 may comprise multiple subframes, which may of the same size or different size. Each subframe in subframes 1601 may have a start transmission and end transmission time, which may be represented as a slot number or time. Subframe 1602 may be a subframe within subframes 1601. Subframe 1602 may be sent by gateway 103 at a gateway downlink reference time 1603, which may be received by UE 101 at a UE downlink reference time 1604. There may be a UE propagation delay 1605, which may be the difference between UE downlink reference time 1604 and gateway downlink reference time 1603.

UE 101 may transmit, or indicate, a subframe 1606 at a UE uplink reference time 1607, which may be received by gateway 103 at gateway uplink reference time 1609. There may be a UE propagation delay 1605 (not shown), which may be the difference between gateway uplink reference time 1609 and UE uplink time 1607. UE uplink reference time 1607 may be calculated by subtracting a UE timing advance 1608 from UE downlink reference time 1604. UE timing advance 1608 may be determined from any of the previously mentioned timing advance techniques.

Subframes 1612 may be subframes transmitted by UE 101 and may use Configuration Grant (CG) transmissions. A subframe 1613 may be a subframe within subframes 1612. Subframes 1612 may have a period 1611 between each subframe that may be transmitted using CG transmissions. UE 101 may transmit subframe 1613 at a CG UE uplink transmission time 1614. Gateway 103 may receive subframe 1613 at a CG gateway uplink receive time 1615.

When using Configured Grant Type 1, a transmission occasion may start when the following equation is satisfied below, in (1):

[(SFN×numberOfSlotsPerFrame×numberOfSymbol-sPerSlot)+(slot number in the frame×num-berOfSymbolsPerSlot)+symbol number in the slot]=(timeReferenceSFN-r16×numberOfSlot-sPerFrame numberOfSymbolsPerSlot+timeDo-mainOffset×numberOfSymbolsPerSlot+$K_{offset}$× numberOfSymbolsPerSlot+S+N×periodicity) modulo(1024×numberOfSlotsPerFrame× numberOfSymbolsPerSlot),  (1)

where timeDomainOffset and periodicity may be both specified within the ConfiguredGrantConfig parameter structure, which may be found in 3GPP TS 38.331 V16.2.0, "Radio Resource Control (RRC) protocol specification (Release 16)." SFN may be System Frame Number. S may correspond to the starting symbol deducted from the timeDomainAllocation, for example, N≥0 may be an integer corresponding to an $N^{th}$ transmission occasion of subframes 1612. Definitions for the terms, as described in the 3GPP TS 38.331 V16.2.0 standard, are described below:

SFN: System Frame Number (which may range from 0 to 1023);
numberOfSlotsPerFrame: Number of slots per frame;
numberOfSymbolsPerSlot: Number of symbols per slot;
slot number in the frame: a number within a frame;
symbol number in the slot: a symbol number within a slot;
timeReferenceSFN: SFN that may be used for determination of the offset of a resource in time domain. The UE may use the closest SFN with the indicated number preceding the reception of the configured grant configuration;
timeDomainOffset: Offset of a resource with respect to SFN=timeReferenceSFN in time domain;
S: corresponds to a starting symbol deducted from the timeDomainAllocation IE (TS 38.331);
N: transmission occasion; and
periodicity: periodicity of the configured grant Type 1.

In one embodiment, the time between CG gateway uplink receive time 1615 and CG UE uplink send time may be UE propagation delay 1605. A gNB, via gateway 103, may configure UE 101 timing of transmissions of subframes 1612 such that the first transmission occasion, which may be subframe 1613, may occur after the arrival of subframe 1606 at gateway 103 at gateway uplink reference time 1609. Referring to equation 1, the configured symbol number in the slot, which may associated with time CG UE uplink send time 1614 may occur in an amount greater than or equal to UE timing advance 1608 after UE uplink reference time 1607. This may be referred to as timing relationship $K_{offset}$ time 1610. From gateway UL reference time 1609 t CG gateway uplink receive time 1615, a gNB via gateway 103 may not receive any UL CG data packets. Timing relationship $K_{offset}$ time 1610 may be calculated by multiplying numberOfSymbolsPerSlot and $K_{offset}$ and then adding it to the timing for a first CG transmission. Equation 1 above shows this relationship in more detail.

Figure 17:
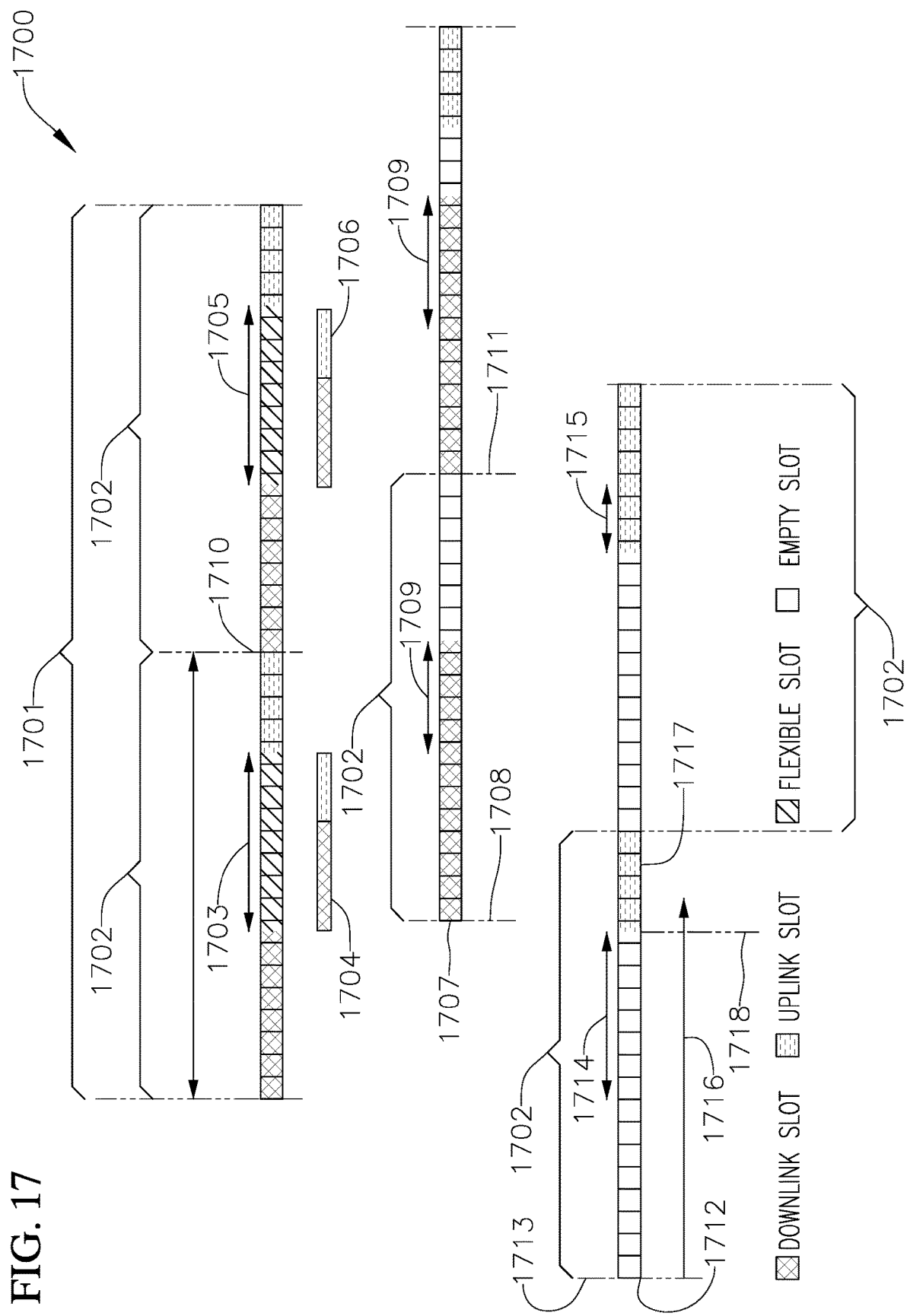
FIG. 17 is a schematic drawing of an offset timing based on timing for DCI Format scheduled Slot-Format Indicators (SFI), according to an embodiment of the present disclosure.

In another embodiment, $K_{offset}$ may be based on timing for DCI format scheduled Slot-Format Indicators (SFI) and may be used for TDD, as described in FIG. 2. In one embodiment, DCI format may be DCI format 2_0, however, it may be any other DCI format as well. Referring to FIG. 17, therein is shown a timing offset diagram for $k_{offset}$ timing using DCI format 2_0 with scheduled SFI. SFI may be the format of a slot in DCI that may be sent to UE 101.

Subframes 1701 may be subframes associated with a gNB via gateway 103 and may receive DCI format scheduled SFI. Subframes 1701 may have subframes with start times and/or slot numbers. There may be a DCI periodicity 1702 applied to subframes 1702, which may include one or more of a downlink, flexible, uplink, and empty slot type and may be known as period 1702.

In one embodiment, timing for DCI format scheduled SFI in a period 1702 may be done statically in cell-specific, UE-specific, or both manners and may use RRC signaling by information elements tdd-UL-DL-Con figuration Common and tdd-UL-DL-ConfigurationDedicated, which may be defined in 3GPP TS 38.331 V16.2.0, "Radio Resource Control (RRC) protocol specification (Release 16)." A gNB, via gateway 103, may send configuration commands to UE 101 for each period 1702. There may be downlink, uplink, and flexible subframe, frame, and/or slot configuration. The resulting slot configuration in a period 1702 may include subframes 1703, which may include unallocated flexible slots or symbols. Gateway 103 may send a DCI format command to UE 101 for a period 1702 to configure downlink, uplink, or flexible subframes, which may include slots within subframes. There may be a DCI 2_0-configured subframes 1704 applied to subframes 1703 by making use of DCI format. Some or all of the remaining flexible slots or symbols may be dynamically configured or reconfigured in subframes 1703.

Subframes 1703 may include unallocated flexible slots or symbols in a DCI period 1702, which may be previously configured and may be valid, and may be dynamically configured or reconfigured as DCI configured slots or symbols 1704. Subframes 1705 may include unallocated flexible slots or symbols in a DCI period 1702, may be newly configured valid, and may be dynamically configured or reconfigured as DCI configured slots or symbols 1706.

UE 101 may have UE downlink subframes 1707, which may be subframes with downlink slots and empty slots for each DCI period 1702. UE 101 may have UE uplink subframes 1712, which may start at a UE uplink slot 1713 and may include empty and uplink slots in each DCI period 1702. UE uplink subframes 1712 may include a previous uplink configuration 1714 and a new uplink configuration 1715. Previous uplink configuration 1714 may be valid in a first period 1702 and new uplink configuration 1715 may be valid in a subsequent period 1702.

UE 101 may be configured to monitor PDCCH for a periodicity, such as DCI period 1702, such that UE 101 may be able to decode DCI format. UE 101 may receive DCI format data in UE downlink slot 1708, which may include new downlink configuration data 1709. There may be a UE downlink receive time 1711, which may be the time UE 101 receives data from a gateway downlink transmit time 1710 and may be the start of a new DCI period 1702.

In one embodiment, there may be a propagation delay between UE 101 sending data uplink to gateway 103 and gateway 103 sending data downlink to UE 101. Thus, UE 101 may not reconfigure its uplink slots or symbols any time earlier than a $K_{offset}$ 1716 number of slots after UE uplink slot 1713. UE 101 may reconfigure uplink slots after a number of slots UE uplink slot 1713 plus $K_{offset}$ 1716, which may be indicated in SFI by a gNB via gateway 103 to UE 101. In one embodiment, the number of slots that may be indicated in SFI may be approximately the same as $K_{offset}$ 1716 slots. In another embodiment, the number of slots indicated in SFI may be higher than $K_{offset}$ 1716.

In another embodiment, the number of slots to be indicated in SFI by UE 101 to gateway 103 may be applying an uplink portion indicated in SFI by an amount $K_{offset}$ 1716 later than a current slot. The current slot may be UE uplink slot 1713. The uplink portion indicated in SFI may be UE uplink portion 1717. UE uplink portion 1717 may begin at UE uplink slot start 1718, which may be $K_{offset}$ 1716 values or more from UE uplink slot 1713. In another embodiment, UE uplink slot start 1718 may be fewer thank $K_{offset}$ values from UE uplink slot 1713. In on embodiment, UE 101 may receive an uplink portion of DCI-scheduled SFI at UE uplink slot 1713, and may apply the provided slot format for uplink slots at $K_{offset}$ 1716 slots after UE Uplink slot 1713, which may be UE uplink slot start 1718. For uplink slots earlier than UE uplink slot start 1718, UE 101 may use a previously configured configuration, which may be previous uplink configuration 1714.

In another embodiment, SFI for UE uplink slot 1713 may implicitly indicate UE uplink portion 1717 at time UE uplink slot start time and UE uplink portion 1717 may be indicated by a previously-received SFI. UE 101 may apply a new slot configuration for uplink slots or symbols, which may be new uplink configuration 1715.

In another embodiment, for downlink slots or symbols, after a UE 101 decodes a DCI format in a UE downlink slot 1708, UE 101 may configure subsequent slots as downlink slots or symbols based on the SFI indicated to it in the DCI format, which may be new downlink configuration 1709. In one embodiment, new downlink configuration 1709 may be based on UE 101 configuring its downlink slots or symbols for the following slots after UE downlink slot 1708 according to the SFI indicated in the DCI Format received in UE downlink slot 1708.

In another embodiment, $K_{offset}$ may be based on cell- or beam-specific, dynamically indicated $K_{offset}$ values. All UEs in a cell 106 may be configured by a network by a single value $K_{offset}$ that may be an RRC parameter. $K_{offset}$ may be configured the same was as other timing RRC parameters, such as $K_1$ and $K_2$, are configured, or $K_{offset}$ may be configured differently. $K_{offset}$ may be selected to support a worst-case scenario where $K_{offset}$ may be greater than the timing advance value of a UE with the longest timing advance in cell 106.

Figure 18:
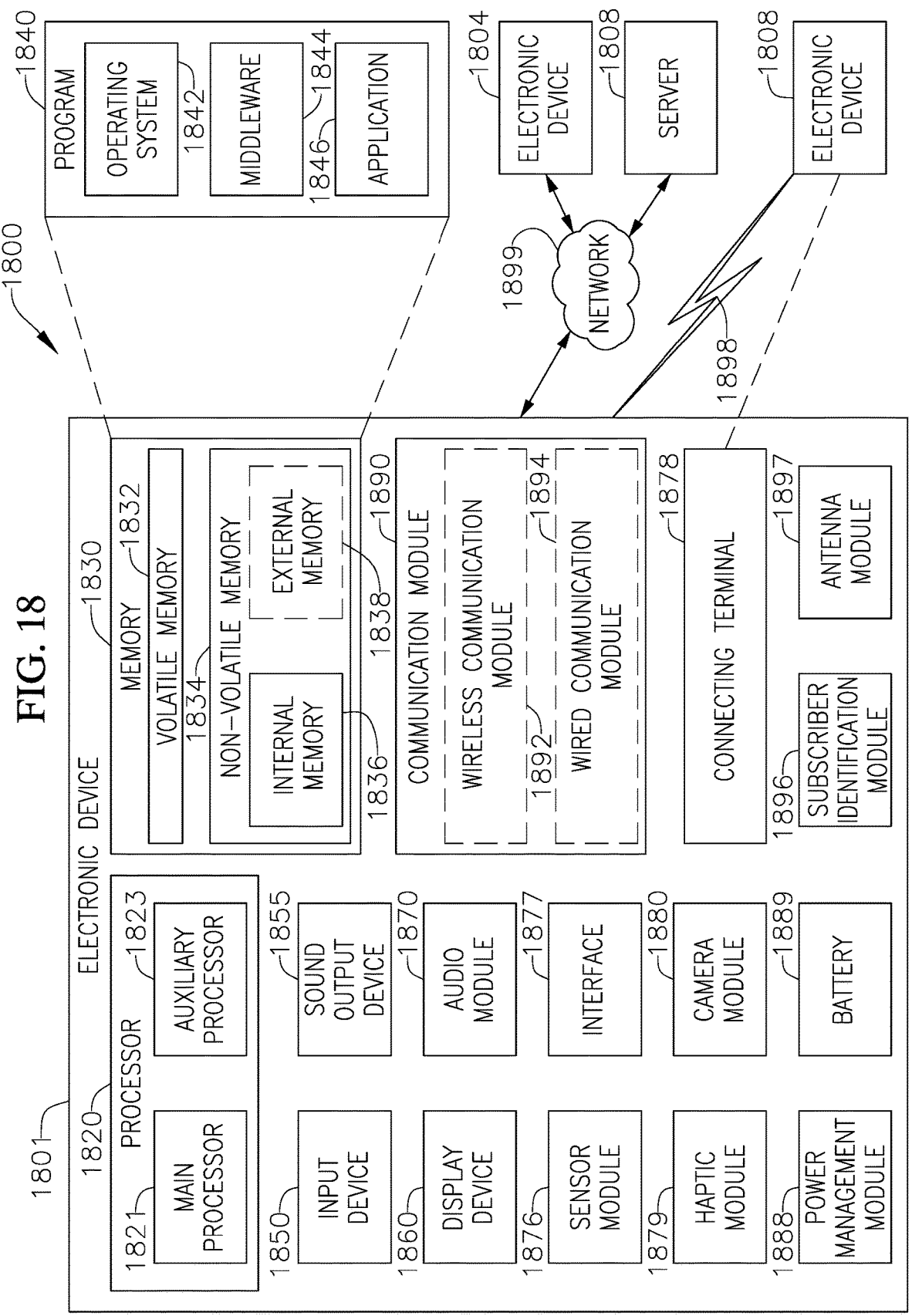
FIG. 18 is an example of a system configured to manage timing advances and $K_{offset}$ values, according to some embodiments.

FIG. 18 shows an example of a system 1800 configured to manage timing advances and $K_{offset}$ values, according to some embodiments. Referring to FIG. 18, the electronic device 1801 (which may be similar to, or the same as, the UE 101) in the network environment 1800 may communicate with an electronic device 1802 via a first network 1898 (e.g., a short-range wireless communication network, such as a Wi-Fi network), or an electronic device 1804 or a server 1808 (which may be similar to, or the same as, the gNB via gateway 103) via a second network 1899 (which may be similar to, or the same as, the network 100 which may use satellite 102), such as a long-range wireless communication network (e.g., a cellular communication network, such as a 5G network). The electronic device 1801 may communicate with the electronic device 1804 via the server 1808. The electronic device 1801 may include a processor 1820, a memory 1830, an input device 1850, a sound output device 1855, a display device 1860, an audio module 1870, a sensor module 1876, an interface 1877, a haptic module 1879, a camera module 1880, a power management module 1888, a battery 1889, a communication module 1890, a subscriber identification module (SIM) 1896, and/or an antenna module 1897. In one embodiment, at least one of the components (e.g., the display device 1860 or the camera module 1880) may be omitted from the electronic device 1801, or one or more other components may be added to the electronic device 1801. In one embodiment, some of the components may be implemented as a single integrated circuit (IC). For example, the sensor module 1876 (e.g., a fingerprint sensor, an iris sensor, or an illuminance sensor) may be embedded in the display device 1860 (e.g., a display), or the display device 1860 may include one or more sensors in addition to the sensor module 1876.

In some embodiments, the electronic device 1801 may include a computing device or processor configured to implement managing timing advances and $K_{offset}$ values, such as the methods of managing timing advances and $K_{offset}$ values described herein.

The processor 1820 may execute, for example, software (e.g., a program 1840) to control at least one other component (e.g., a hardware or a software component) of the electronic device 1801 coupled with the processor 1820, and may perform various data processing and/or computations. As at least a part of the data processing and/or computations, the processor 1820 may load a command or data received from another component (e.g., the sensor module 1876 or the communication module 1890) in volatile memory 1832, process the command or the data stored in the volatile memory 1832, and store resulting data in non-volatile memory 1834. The processor 1820 may include a main processor 1821 (e.g., a central processing unit (CPU) or an application processor (AP)), and an auxiliary processor 1823 (e.g., a graphics processing unit (GPU), an image signal processor (ISP), a sensor hub processor, or a communication processor (CP)) that is operable independently from, or in conjunction with, the main processor 1821. Additionally or alternatively, the auxiliary processor 1823 may be adapted to consume less power than the main processor 1821, and/or execute a particular function. The auxiliary processor 1823 may be implemented as being separate from, or as a part of, the main processor 1821.

The auxiliary processor 1823 may control at least some of the functions or states related to at least one component (e.g., the display device 1860, the sensor module 1876, or the communication module 1890) from among the components of the electronic device 1801, instead of the main processor 1821 while the main processor 1821 is in an inactive (e.g., sleep) state, or together with the main processor 1821 while the main processor 1821 is in an active state (e.g., executing an application). According to one embodiment, the auxiliary processor 1823 (e.g., an image signal processor or a communication processor) may be implemented as a part of another component (e.g., the camera module 1880 or the communication module 1890) functionally related to the auxiliary processor 1823.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 and/or the non-volatile memory 1834.

The program 1840 may be stored in the memory 1830 as software, and may include, for example, an operating system (OS) 1842, middleware 1844, or an application 1846.

The input device 1850 may receive a command or data to be used by another component (e.g., the processor 1820) of the electronic device 1801, from the outside (e.g., a user) of the electronic device 1801. The input device 1850 may include, for example, a microphone, a mouse, and/or a keyboard.

The sound output device 1855 may output sound signals to the outside of the electronic device 1801. The sound output device 1855 may include, for example, a speaker or a receiver. The speaker may be used for general purposes, such as playing multimedia or recording, and the receiver may be used for receiving an incoming call. According to one embodiment, the receiver may be implemented as being separate from, or as a part of, the speaker.

The display device 1860 may visually provide information to the outside (e.g., a user) of the electronic device 1801. The display device 1860 may include, for example, a display, a hologram device, and/or a projector and control circuitry to control a corresponding one of the display, the hologram device, and the projector. According to one embodiment, the display device 1860 may include touch circuitry adapted to detect a touch, or sensor circuitry (e.g., a pressure sensor) adapted to measure the intensity of force incurred by the touch.

The audio module 1870 may convert a sound into an electrical signal and vice versa. According to one embodiment, the audio module 1870 may obtain the sound via the input device 1850, and/or output the sound via the sound output device 1855 or a headphone of an external electronic device 1802 directly (e.g., wired) or wirelessly coupled with the electronic device 1801.

The sensor module 1876 may detect an operational state (e.g., power or temperature) of the electronic device 1801 and/or an environmental state (e.g., a state of a user) external to the electronic device 1801, and then generate an electrical signal or data value corresponding to the detected state. The sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 1877 may support one or more specified protocols to be used for the electronic device 1801 to be coupled with the external electronic device 1802 directly (e.g., wired) or wirelessly. According to one embodiment, the interface 1877 may include, for example, a high definition multimedia interface (HDMI), a universal serial bus (USB) interface, a secure digital (SD) card interface, and/or an audio interface.

A connecting terminal 1878 may include a connector via which the electronic device 1801 may be physically connected with the external electronic device 1802. According to one embodiment, the connecting terminal 1878 may include, for example, an HDMI connector, a USB connector, an SD card connector, and/or an audio connector (e.g., a headphone connector).

The haptic module 1879 may convert an electrical signal into a mechanical stimulus (e.g., a vibration or a movement) and/or an electrical stimulus which may be recognized by a user via tactile sensation or kinesthetic sensation. According to one embodiment, the haptic module 1879 may include, for example, a motor, a piezoelectric element, and/or an electrical stimulator.

The camera module 1880 may capture a still image or moving images. According to one embodiment, the camera module 1880 may include one or more lenses, image sensors, image signal processors, and/or flashes.

The power management module 1888 may manage power supplied to the electronic device 1801. The power management module 1888 may be implemented as at least a part of, for example, a power management integrated circuit (PMIC).

The battery 1889 may supply power to at least one component of the electronic device 1801. According to one embodiment, the battery 1889 may include, for example, a primary cell which is not rechargeable, a secondary cell which is rechargeable, and/or a fuel cell.

The communication module 1890 may support establishing a direct (e.g., wired) communication channel or a wireless communication channel between the electronic device 1801 and the external electronic device (e.g., the electronic device 1802, the electronic device 1804, and/or the server 1808) and performing communication via the established communication channel. The communication module 1890 may include one or more communication processors that are operable independently from the processor 1820 (e.g., the AP) and may support a direct (e.g., wired) communication and/or a wireless communication. According to one embodiment, the communication module 1890 may include a wireless communication module 1892 (e.g., a cellular communication module, a short-range wireless communication module, and/or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth®, wireless-fidelity (Wi-Fi) direct, and/or a standard of the Infrared Data Association (IrDA)) or the second network 1899 (e.g., a long-range communication network, such as a cellular network, the Internet, and/or a computer network (e.g., LAN or wide area network (WAN)). Bluetooth® is a registered trademark of Bluetooth SIG, Inc., Kirkland, WA. These various types of communication modules may be implemented as a single component (e.g., a single IC), or may be implemented as multiple components (e.g., multiple ICs) that are separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The antenna module 1897 may transmit and/or receive a signal and/or power to and/or from the outside (e.g., the external electronic device) of the electronic device 1801. According to one embodiment, the antenna module 1897 may include one or more antennas, and, therefrom, at least one antenna appropriate for a communication scheme used in the communication network, such as the first network 1898 and/or the second network 1899, may be selected, for example, by the communication module 1890 (e.g., the wireless communication module 1892). The signal and/or the power may then be transmitted and/or received between the communication module 1890 and the external electronic device via the selected at least one antenna.

At least some of the above-described components may be mutually coupled and communicate signals (e.g., commands and/or data) therebetween via an inter-peripheral communication scheme (e.g., a bus, a general purpose input and output (GPIO), a serial peripheral interface (SPI), and/or a mobile industry processor interface (MIPI)).

According to one embodiment, commands and/or data may be transmitted and/or received between the electronic device 1801 and the external electronic device 1804 via the server 1808 coupled with the second network 1899. Each of the electronic devices 1802 and 1804 may be a device of a same type as, or a different type from, the electronic device 1801. All or some of operations to be executed at or by the electronic device 1801 may be executed at one or more of the external electronic devices 1802, 1804, or the server 1808. For example, if the electronic device 1801 should perform a function and/or a service automatically, or in response to a request from a user or another device, the electronic device 1801, instead of, or in addition to, executing the function and/or the service, may request the one or more external electronic devices to perform at least a part of the function and/or the service. The one or more external electronic devices receiving the request may perform the at least a part of the function and/or the service requested, and/or an additional function and/or an additional service related to the request, and transfer an outcome of the performing to the electronic device 1801. The electronic device 1801 may provide the outcome, with or without further processing of the outcome, as at least a part of a reply to the request. To that end, a cloud computing, distributed computing, and/or client-server computing technology may be used, for example.

One embodiment may be implemented as software (e.g., the program 1840) including one or more instructions that are stored in a storage medium (e.g., internal memory 1836 or external memory 1838) that is readable by a machine (e.g., the electronic device 1801). For example, a processor of the electronic device 1801 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, the term "array" refers to an ordered set of numbers regardless of how stored (e.g., whether stored in consecutive memory locations, or in a linked list). As used herein, the term "rectangle" includes a square as a special case, i.e., a square is an example of a rectangle. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. For example, if a first component is "connected to" a second component, a third component may be connected between the first component and the second component (e.g., a first side of the third component may be connected to the first component, and a second side of the third component may be connected to the second component). In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a to wireless communication networks, and more particularly managing timing advance and offset values for uplink transmissions i have been specifically described and illustrated herein, many modifications and variations will be apparent to those skilled in the art. Accordingly, it is to be understood that a to wireless communication networks, and more particularly to managing timing advance and offset values for uplink transmissions constructed according to principles of this disclosure may be embodied other than as specifically described herein. The invention is also defined in the following claims, and equivalents thereof.

What is claimed is:

1. A method of enabling communication between a user equipment (UE) and a non-terrestrial network (NTN), comprising:

receiving, at the UE, satellite position data of the NTN;
calculating, at the UE, a first distance based on the satellite position data and a position of the UE, and a timing advance based on the first distance;
receiving, at the UE, a $K_{offset}$ value, wherein the $K_{offset}$ value is transmitted to the UE by the NTN; and
applying, at the UE, at least one of the timing advance and $K_{offset}$ to configure communication with the NTN.

2. The method of claim 1, wherein the UE further receives a gateway position data.

3. The method of claim 2, wherein the UE further calculates a second distance between the satellite position data and the gateway position data.

4. The method of claim 3, wherein the UE further calculates the timing advance by
dividing the first distance by a speed to obtain a first propagation delay,
dividing the second distance by the speed to obtain a second propagation delay,
summing the first propagation delay and the second propagation delay, and doubling the sum.

5. The method of claim 3, wherein the timing advance is a full timing advance compensation.

6. The method of claim 1, wherein the UE further receives a reference point position data, wherein the reference point position data is on a feeder link.

7. The method of claim 6, wherein the UE further receives a common timing advance value.

8. The method of claim 7, wherein the UE further calculates a third distance between the reference point position data and the satellite position data.

9. The method of claim 8, wherein the UE further calculates the timing advance by
dividing the first distance by a speed to obtain a first propagation delay,
dividing the third distance by the speed to obtain a third propagation delay,
summing the first propagation delay, the third propagation delay, and the common timing advance value, and doubling the sum.

10. The method of claim 9, wherein the timing advance is one of a full timing advance compensation and a differential timing advance compensation.

11. The method of claim 6, wherein the reference point position data is the satellite position data.

12. The method of claim 1, wherein the UE further receives a reference point position data, wherein the reference point position data is located in a cell that the UE is located in.

13. The method of claim 12, wherein the UE further receives a common timing advance value.

14. The method of claim 13, wherein the UE further calculates a fourth distance between the reference point position data and the satellite position data.

15. The method of claim 14, wherein the UE further calculates a differential timing advance by
dividing the first distance by a speed to obtain a first propagation delay,
dividing the fourth distance by the speed to obtain a fourth propagation delay,
subtracting the fourth propagation delay from the first propagation delay, and doubling the subtraction.

16. The method of claim 1, wherein the UE receives the $K_{offset}$ value in a group common DCI format, and/or a MAC-CE format, and the $K_{offset}$ value is a fixed number of bits.

17. The method of claim 1, wherein the $K_{offset}$ value is greater than or equal to the timing advance.

18. The method of claim 16, wherein the $K_{offset}$ value is used for timing for a PUSCH transmission scheduled by DCI.

19. A system that enables communication between a user equipment (UE) and a non-terrestrial network (NTN), the system configured to:
- receive, at the UE, satellite position data of the NTN;
- calculate, at the UE, a first distance and based on the satellite position data and a position of the UE, and a timing advance based on the first distance;
- receive, at the UE, a $K_{offset}$ value, wherein the $K_{offset}$ value is transmitted to the UE by the NTN; and
- apply, at the UE, at least one of the timing advance and $K_{offset}$ to configure communication with the NTN.

20. A user equipment (UE) device configured to:
- receive, at the UE, position data corresponding to a non-terrestrial network (NTN);
- calculate, at the UE, a first distance and based on the position data and a position of the UE, and a timing advance based on the first distance;
- receive, at the UE, a $K_{offset}$ value, wherein the $K_{offset}$ value is transmitted to the UE by the NTN; and
- apply, at the UE, at least one of the timing advance and $K_{offset}$ to configure communication with the NTN.

* * * * *